United States Patent
Kataoka et al.

(10) Patent No.: US 10,095,405 B2
(45) Date of Patent: Oct. 9, 2018

(54) GESTURE KEYBOARD INPUT OF NON-DICTIONARY CHARACTER STRINGS

(71) Applicant: Google Inc., Mountain View, CA (US)

(72) Inventors: Satoshi Kataoka, Tokyo (JP); Keisuke Kuroyanagi, Tokyo (JP)

(73) Assignee: Google LLC, Mountain View, CA (US)

( * ) Notice: Subject to any disclaimer, the term of this patent is extended or adjusted under 35 U.S.C. 154(b) by 156 days.

(21) Appl. No.: 15/271,769

(22) Filed: Sep. 21, 2016

(65) Prior Publication Data

US 2017/0010800 A1 Jan. 12, 2017

Related U.S. Application Data

(63) Continuation of application No. 13/865,977, filed on Apr. 18, 2013, now Pat. No. 9,454,240.

(60) Provisional application No. 61/761,072, filed on Feb. 5, 2013.

(51) Int. Cl.
*G06F 3/0488* (2013.01)
*G06F 3/023* (2006.01)
*G06F 3/041* (2006.01)

(52) U.S. Cl.
CPC ........ *G06F 3/04883* (2013.01); *G06F 3/0237* (2013.01); *G06F 3/04886* (2013.01); *G06F 3/0414* (2013.01)

(58) Field of Classification Search
CPC ............. G06F 3/04883; G06F 3/04886; G06F 3/0237; G06F 3/0414
See application file for complete search history.

(56) References Cited

U.S. PATENT DOCUMENTS

| | | |
|---|---|---|
| 4,903,206 A | 2/1990 | Itoh et al. |
| 5,764,241 A | 6/1998 | Elliott et al. |
| 5,805,911 A | 9/1998 | Miller |
| 5,829,002 A | 10/1998 | Priest |

(Continued)

FOREIGN PATENT DOCUMENTS

| | | |
|---|---|---|
| CN | 1761989 A | 4/2006 |
| CN | 1954355 A | 4/2007 |

(Continued)

OTHER PUBLICATIONS

First Office Action and Search Report, and translation thereof, from counterpart Chinese Application No. 201380075361.6, dated Oct. 10, 2017, 17 pp.

(Continued)

*Primary Examiner* — Aneeta Yodichkas
(74) *Attorney, Agent, or Firm* — Shumaker & Sieffert, P.A.

(57) ABSTRACT

A computing device is described that outputs, for display, a graphical keyboard comprising a plurality of keys. The computing device receives, an indication of a gesture detected at a presence-sensitive input device. The computing device determines, based at least in part on the indication of the gesture and at least one characteristic of the gesture, one or more keys from the plurality of keys. The computing device determines a character string based on the one or more keys from the plurality of keys. In response to determining that the character string is not included in a lexicon and a spatial model probability associated with the one or more keys from the plurality of keys exceeds a probability threshold, the computing device outputs, for display, the character string.

20 Claims, 7 Drawing Sheets

(56) References Cited

U.S. PATENT DOCUMENTS

| | | | |
|---|---|---|---|
| 5,923,778 A | 7/1999 | Chen et al. |
| 5,943,674 A | 8/1999 | Schofield |
| 6,119,079 A | 9/2000 | Wang et al. |
| 6,286,064 B1 | 9/2001 | King et al. |
| 6,292,179 B1 | 9/2001 | Lee |
| 6,525,749 B1 | 2/2003 | Moran et al. |
| 6,654,733 B1 | 11/2003 | Goodman et al. |
| 6,801,190 B1 | 10/2004 | Robinson et al. |
| 7,030,863 B2 | 4/2006 | Longe et al. |
| 7,035,788 B1 | 4/2006 | Nakajima et al. |
| 7,042,443 B2 | 5/2006 | Woodard et al. |
| 7,075,520 B2 | 7/2006 | Williams |
| 7,088,345 B2 | 8/2006 | Robinson et al. |
| 7,098,896 B2 | 8/2006 | Kushler et al. |
| 7,145,554 B2 | 12/2006 | Bachmann |
| 7,151,530 B2 | 12/2006 | Roeber et al. |
| 7,199,786 B2 | 4/2007 | Suraqui |
| 7,250,938 B2 | 7/2007 | Kirkland et al. |
| 7,251,367 B2 | 7/2007 | Zhai |
| 7,277,088 B2 | 10/2007 | Robinson et al. |
| 7,385,591 B2 | 6/2008 | Goodman |
| 7,453,439 B1 | 11/2008 | Kushler et al. |
| 7,508,324 B2 | 3/2009 | Suraqui |
| 7,574,356 B2 | 8/2009 | Parthasarathy |
| 7,634,408 B1 | 12/2009 | Mohri |
| 7,706,616 B2 | 4/2010 | Kristensson et al. |
| 7,716,579 B2 | 5/2010 | Gunn et al. |
| 7,750,891 B2 | 7/2010 | Stephanick et al. |
| 7,895,031 B2 | 2/2011 | Nakajima et al. |
| 7,921,361 B2 | 4/2011 | Gunn et al. |
| 7,996,224 B2 | 8/2011 | Bacchiani et al. |
| 8,036,878 B2 | 10/2011 | Assadollahi |
| 8,077,983 B2 | 12/2011 | Qiu et al. |
| 8,135,582 B2 | 3/2012 | Suraqui |
| 8,423,916 B2 | 4/2013 | Chihara et al. |
| 8,473,843 B2 | 6/2013 | Lundy et al. |
| 8,756,499 B1 | 1/2014 | Kataoka et al. |
| 9,047,268 B2 | 6/2015 | Ouyang et al. |
| 9,454,240 B2 | 9/2016 | Kataota et al. |
| 2002/0188448 A1 | 12/2002 | Goodman et al. |
| 2003/0011574 A1 | 1/2003 | Goodman |
| 2004/0120583 A1 | 6/2004 | Zhai |
| 2004/0140956 A1 | 7/2004 | Kushler et al. |
| 2005/0052406 A1 | 3/2005 | Stephanick |
| 2005/0114115 A1 | 5/2005 | Karidis |
| 2005/0146508 A1 | 7/2005 | Kirkland |
| 2005/0190973 A1 | 9/2005 | Kristensson |
| 2005/0192802 A1 | 9/2005 | Robinson et al. |
| 2006/0095263 A1 | 5/2006 | Kawasaki et al. |
| 2006/0119582 A1 | 6/2006 | Ng et al. |
| 2006/0129397 A1 | 6/2006 | Li et al. |
| 2006/0176283 A1 | 8/2006 | Suraqui |
| 2006/0206313 A1 | 9/2006 | Xu et al. |
| 2007/0040813 A1 | 2/2007 | Kushler |
| 2007/0074131 A1 | 3/2007 | Assadollahi |
| 2007/0089070 A1 | 4/2007 | Jaczyk |
| 2008/0154576 A1 | 6/2008 | Wu et al. |
| 2008/0195388 A1* | 8/2008 | Bower ................ G06F 3/0237 704/243 |
| 2008/0316183 A1 | 12/2008 | Westerman et al. |
| 2009/0099841 A1 | 4/2009 | Chen |
| 2009/0113299 A1 | 4/2009 | Chung |
| 2009/0216690 A1 | 8/2009 | Badger |
| 2010/0020025 A1 | 1/2010 | Lemort et al. |
| 2010/0153880 A1 | 6/2010 | Dinn |
| 2010/0315266 A1 | 12/2010 | Gunawardana et al. |
| 2011/0063231 A1 | 3/2011 | Jakobs et al. |
| 2011/0071834 A1 | 3/2011 | Kristensson et al. |
| 2011/0078613 A1 | 3/2011 | Bangalore |
| 2011/0154193 A1 | 6/2011 | Creutz et al. |
| 2011/0202330 A1 | 8/2011 | Dai et al. |
| 2011/0208507 A1 | 8/2011 | Hughes |
| 2011/0320978 A1 | 12/2011 | Horodezky et al. |
| 2012/0029910 A1 | 2/2012 | Medlock et al. |
| 2012/0036469 A1 | 2/2012 | Suraqui |
| 2012/0259615 A1 | 10/2012 | Morin et al. |
| 2012/0324391 A1 | 12/2012 | Tocci |
| 2013/0046544 A1 | 2/2013 | Kay et al. |
| 2013/0125037 A1 | 5/2013 | Pasquero et al. |
| 2013/0173611 A1 | 7/2013 | Wald et al. |

FOREIGN PATENT DOCUMENTS

| | | |
|---|---|---|
| CN | 103038728 A | 4/2013 |
| JP | 2005196759 A | 7/2005 |
| JP | 2012248153 A | 12/2012 |
| KR | 20070114329 A | 12/2007 |
| WO | 2005064587 A2 | 7/2005 |
| WO | 2011113057 A1 | 9/2011 |
| WO | 2014066106 A2 | 5/2014 |

OTHER PUBLICATIONS

Bassil et al., "Parallel Spell-Checking Algorithm Based on Yahoo! N-Grams Dataset," International Journal of Research and Reviews in Computer Science, vol. 3, No. 1, Feb. 2012, 8 pp.

Bazzi, et al., "Modeling Out of Vocabulary Words for Robust Speech Recognition," Spoken Language Systems Group, Laboratory for Computer Science, Oct. 16, 2000, 4 pp.

Goodman, et al. "Language Modeling for Soft Keyboards," IUI'02, Jan. 13-16, 2002, 2 pp.

Goodman, et al., "Language Modeling for Soft Keyboards," American Association for Artificial Intelligence, Jul. 28-Aug. 1, 2002, 6 pp.

International Preliminary Report on Patentability from International Application No. PCT/US2013/077181, dated Aug. 20, 2015, 7 pp.

International Search Report and Written Opinion of International application No. PCT/US2013/077181, dated May 16, 2014, 11 pp.

Nakov, "Combing Word-Level and Character-Level Models for Machine Translation Between Closely-Related Lanuages", Proceedings of the 5oth Annual Meeting of the Association for Computational Linguistics, Jul. 8-14, 2012, pp. 301-305.

Natasha Lomas, "Hey Apple, What The Next iPhone Really, Really Needs Is a Much Better Keyboard," http:!/techcrunch.com/2013/04/21/the-iphone-keyboard-stinks/, Apr. 21, 2013, 6 pgs.

Pirinen et al., "Creating and Weighting Hunspell Dictionaries as Finite-State Automata," Investigationes Linguisticae 19 Jan. 1, 2010, 16 pp.

Prosecution History from U.S. Pat. No. 9,454,240, dated Apr. 18, 2013 through Jul. 19, 2016, 109 pp.

Intent to Grant dated Apr. 17, 2018, from counterpart European Application No. 13824437.1, 7 pp.

* cited by examiner

GESTURE KEYBOARD INPUT OF NON-DICTIONARY CHARACTER STRINGS

This application is a Continuation of U.S. application Ser. No. 13/865,977, filed Apr. 18, 2013, which claims the benefit of U.S. Provisional Application No. 61/761,072, filed Feb. 5, 2013, the entire content of which is hereby incorporated by reference.

BACKGROUND

Some computing devices (e.g., mobile phones, tablet computers, etc.) may provide, as part of a graphical user interface, a graphical keyboard for composing text using a presence-sensitive input device (e.g., a presence-sensitive display such as a touchscreen). The graphical keyboard may enable a user of the computing device to enter text (e.g., an e-mail, a text message, or a document, etc.). For instance, a presence-sensitive input device of a computing device may output a graphical (or "soft") keyboard that enables the user to enter data by indicating (e.g., by tapping) keys displayed at the presence-sensitive input device.

In some cases, the computing device may present a continuous-gesture graphical keyboard (sometimes referred to as a "combo gesture keyboard," or "gesture keyboard") with which the user can interact by inputting a continuous gesture that indicates a word to be input to the computing device (e.g., by sliding his or her finger over various regions of the presence-sensitive input device associated with desired keys of the keyboard). In this way, continuous-gesture graphical keyboards allow a user to enter a word or group of words with a single gesture. As such, a continuous-gesture graphical keyboard may allow the user to achieve a certain degree of input efficiency.

In some examples, a computing device that provides a gesture keyboard may rely on word prediction, auto-correction, and/or suggestion techniques for determining a word based on one or more received gesture inputs. These techniques may speed up text entry and minimize spelling mistakes of in-vocabulary words (e.g., words in a dictionary). However, one or more of the techniques may have certain drawbacks. For instance, in some examples, a computing device that provides a gesture keyboard and relies on one or more of the techniques may not correctly determine out-of-vocabulary words (e.g., words not included in a dictionary) from the gesture input entered at the presence-sensitive input device. As such, a user may need to perform additional effort to enter non-dictionary words (e.g., names, slang, abbreviations, acronyms, and the like) using a gesture input.

SUMMARY

In one example, the disclosure is directed to a method that includes outputting, by a computing device and for display, a graphical keyboard comprising a plurality of keys. The method further includes receiving, by the computing device, an indication of a gesture detected at a presence-sensitive input device. The method further includes determining, by the computing device, based at least in part on the indication of the gesture and at least one characteristic of the gesture, one or more keys from the plurality of keys. The method further includes determining, by the computing device, based on the one or more keys from the plurality of keys, a character string. In response to determining that the character string is not included in a lexicon and a spatial model probability associated with the one or more keys from the plurality of keys exceeds a probability threshold, the method further includes outputting, by the computing device and for display, the character string.

In another example, the disclosure is directed to a computing device comprising at least one processor and at least one module operable by the at least one processor to output, by the computing device and for display, a graphical keyboard comprising a plurality of keys. The at least one module being further operable by the at least one processor to receive, an indication of a gesture detected at a presence-sensitive input device. The at least one module being further operable by the at least one processor to determine, based at least in part on the indication of the gesture and at least one characteristic of the gesture, one or more keys from the plurality of keys. The at least one module being further operable by the at least one processor to determine, based on the one or more keys from the plurality of keys, a character string. In response to determining that the character string is not included in a lexicon and a spatial model probability associated with the one or more keys from the plurality of keys exceeds a probability threshold, the at least one module being further operable by the at least one processor to output, for display, the character string.

In another example, the disclosure is directed to a computer-readable storage medium encoded with instructions that, when executed, cause at least one processor of a computing device to output, for display, a graphical keyboard comprising a plurality of keys. The instructions when executed further cause the at least one processor of the computing device to receive, an indication of a gesture detected at a presence-sensitive input device. The instructions when executed further cause the at least one processor of the computing device to determine, based at least in part on the indication of the gesture and at least one characteristic of the gesture, one or more keys from the plurality of keys. The instructions when executed further cause the at least one processor of the computing device to determine, based on the one or more keys from the plurality of keys, a character string. In response to determining that the character string is not included in a lexicon and a spatial model probability associated with the one or more keys from the plurality of keys exceeds a probability threshold, the instructions when executed further cause the at least one processor of the computing device to output, for display, the character string.

The details of one or more examples are set forth in the accompanying drawings and the description below. Other features, objects, and advantages of the disclosure will be apparent from the description and drawings, and from the claims.

DETAILED DESCRIPTION

Figure 1:
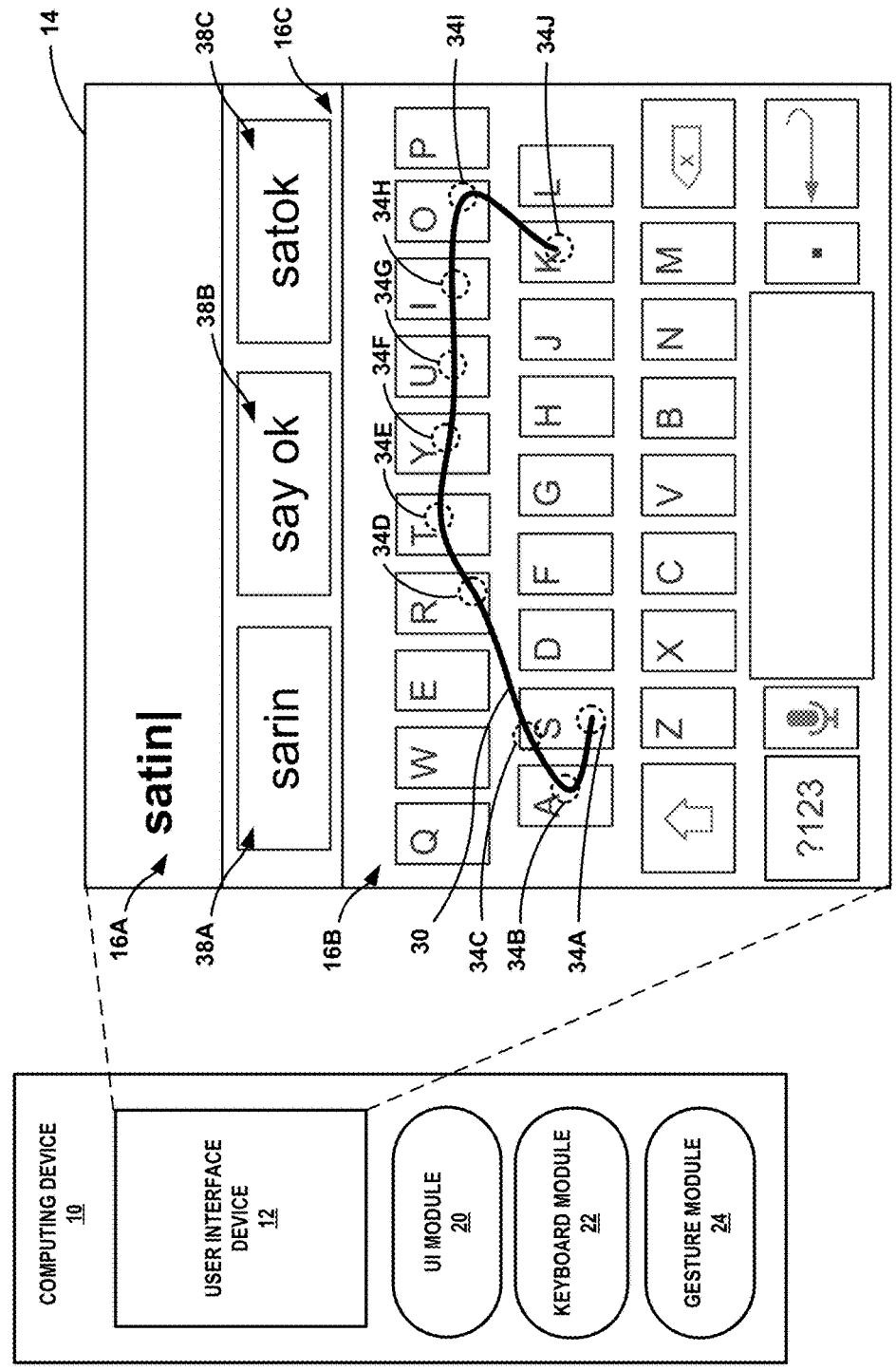
FIG. 1 is a conceptual diagram illustrating an example computing device that is configured to determine an out-of-vocabulary word with a gesture keyboard, in accordance with one or more aspects of the present disclosure.

In general, this disclosure is directed to techniques for selecting one or more keys of a graphical keyboard by determining one or more out-of-vocabulary (OOV) (e.g., non-dictionary) words based on a detected gesture to select one or more keys of a graphical keyboard. In some examples, a computing device that outputs a graphical keyboard, for example, at a presence-sensitive input device, may also receive indications of gestures detected at a presence-sensitive input device. In some examples, a continuous (e.g., non-tap) gesture that traverses locations of multiple keys presented at the presence-sensitive input device may indicate a selection of multiple keys. In some examples, a non-continuous (e.g., tap) gesture may indicate a selection of an individual key. In certain examples, a user may enter a string of text, for instance a word in a dictionary or an OOV word, by performing one or more gestures at or near the presence-sensitive input device. The techniques described may improve accuracy with which a computing device detects a selection of keys intended to generate and output an OOV word.

For instance, rather than relying solely on a spatial model and/or a lexicon to determine a character string based on a gesture input, the techniques may enable a computing device to determine a character string based on one or more characteristics of a gesture input. In certain examples, according to various techniques of this disclosure, a computing device may be configured to output the character string for display at a presence-sensitive input device. In some examples, the computing device may output the character string as a suggested word or phrase in a suggestion region of a user interface. From the suggestion region, a user may select the character string for inclusion in an edit region of an application, e.g., a text entry field of a message application, a web browser, etc.

The character string determined from the gesture input in this way may represent a more accurate selection of keys of the graphical keyboard. As such, the techniques may enable a computing device to determine an OOV character string with, for example, a similar level of accuracy as if the user provided individual key taps at each key of a graphical keyboard. In addition, the techniques may enable the computing device to determine the OOV character string, while improving and/or maintaining the speed and ease that single continuous gesture inputs and gesture-based graphical keyboards provide to the user. Therefore, the techniques described in this disclosure may improve the speed with which a user can type an OOV word at a graphical keyboard. The techniques may limit or prevent the computing device from erroneously auto-correcting or predicting a character string from a gesture input. In this way, the techniques may reduce and/or eliminate the need for the user to correct an auto-corrected or predicted word when entering an OOV word. As such, the computing device may receive fewer inputs from a user to manually correct these mistakes. A computing device that receives fewer inputs may perform fewer operations and as such consume less electrical power.

FIG. 1 is a conceptual diagram illustrating an example computing device that is configured to determine an out-of-vocabulary word with a gesture keyboard, in accordance with one or more aspects of the present disclosure. In the example of FIG. 1, computing device 10 may be a mobile phone. However, in other examples, computing device 10 may be a tablet computer, a personal digital assistant (PDA), a laptop computer, a portable gaming device, a portable media player, an e-book reader, a watch, television platform, or another type of computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input device, such as a resistive touchscreen, a surface acoustic wave touchscreen, a capacitive touchscreen, a projective capacitance touchscreen, a pressure sensitive screen, an acoustic pulse recognition touchscreen, or another presence-sensitive input device technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive screen (e.g., presence-sensitive display) that may receive tactile user input from a user of computing device 10. UID 12 may receive indications of the tactile user input by detecting one or more tap and/or non-tap gestures from a user of computing device 10 (e.g., the user touching or pointing to one or more locations of UID 12 with a finger or a stylus pen). The presence-sensitive screen of UID 12 may present output to a user. UID 12 may present the output as a user interface (e.g., user interface 14) which may be related to functionality provided by computing device 10. For example, UID 12 may present various user interfaces of applications (e.g., an electronic message application, an Internet browser application, etc.) executing at computing device 10. A user of computing device 10 may interact with one or more of these applications to perform a function with computing device 10 through the respective user interface of each application.

Computing device 10 may include user interface ("UI") module 20, keyboard module 22, and gesture module 24. Modules 20, 22, and 24 may perform operations described using software, hardware, firmware, or a mixture of both hardware, software, and firmware residing in and executing on computing device 10. Computing device 10 may execute modules 20, 22, and 24, with multiple processors. Computing device 10 may execute modules 20, 22, and 24 as a virtual machine executing on underlying hardware.

Gesture module 24 of computing device 10 may receive from UID 12, one or more indications of user input detected at UID 12. Generally, each time UID 12 receives an indication of user input detected at a location of UID 12, gesture module 24 may receive information about the user input from UID 12. Gesture module 24 may assemble the information received from UID 12 into a time-ordered sequence of touch events. Each touch event in the sequence may include data or components that represents parameters (e.g., when, where, originating direction) characterizing a presence and/or movement of input at UID 12. Each touch event in the sequence may include a location component corresponding to a location of UID 12, a time component related to when UID 12 detected user input at the location, and an action component related to whether the touch event corresponds to a lift up or a push down at the location.

Gesture module 24 may determine one or more characteristics of the user input based on the sequence of touch events and include information about these one or more characteristics within each touch event in the sequence of touch events. For example, gesture module 24 may determine a start location of the user input, an end location of the user input, a density of a portion of the user input, a speed of a portion of the user input, a direction of a portion of the user input, and a curvature of a portion of the user input. One or more touch events in the sequence of touch events may include (in addition to a time, a location, and an action component as described above) a characteristic component that includes information about one or more characteristics of the user input (e.g., a density, a speed, etc.). Gesture module 24 may transmit, as output to UI module 20, the sequence of touch events including the components or parameterized data associated with each touch event.

UI module 20 may cause UID 12 to present user interface 14. User interface 14 includes graphical elements displayed at various locations of UID 12. FIG. 1 illustrates edit region 16A of user interface 14, graphical keyboard 16B of user interface 14, and suggested word region 16C. Edit region 16A may include graphical elements such as images, objects, hyperlinks, characters of text, etc. Graphical keyboard 16B includes graphical elements displayed as keys. Suggested word region 16C includes suggested words 38A-38C (collectively "suggested words" 38) that represent selectable spelling corrections or word suggestions to replace character strings that are included in edit region 16A. In the example of FIG. 1, edit region 16A includes graphical elements displayed as characters of text (e.g., a word). A user of computing device 10 may enter text in edit region 16A by providing user input at locations of UID 12 that display the keys of graphical keyboard 16B. In response to user input such as this, computing device 10 may output one or more suggested words 38 in suggested word region 16C.

UI module 20 may act as an intermediary between various components of computing device 10 to make determinations based on input detected by UID 12 and generate output presented by UID 12. For instance, UI module 20 may receive, as an input from keyboard module 22, a representation of a keyboard layout of the keys included in graphical keyboard 16B. UI module 20 may receive, as an input from gesture module 24, a sequence of touch events generated from information about user input detected by UID 12. UI module 20 may determine that, based on the location components in the sequence touch events, one or more location components approximate a selection of one or more keys (e.g., UI module 20 may determine the location of one or more of the touch events corresponds to an area of UID 12 that presents graphical keyboard 16B). UI module 20 may transmit, as output to keyboard module 22, the sequence of touch events received from gesture module 24, along with locations where UID 12 presents each of the keys. In response, UI module 20 may receive, as an input from keyboard module 22, a character string and one or more suggested words. UI module 20 may update user interface 14 to include the character string within edit region 16A and one or more suggested words associated with the character string within suggested word region 16C. UI module 20 may cause UID 12 to present the updated user interface 14.

Keyboard module 22 of computing device 10 may transmit, as output to UI module 20 (for inclusion as graphical keyboard 16B of user interface 14) a keyboard layout including a plurality of keys related to one or more written languages (e.g., English, Spanish, etc.). Keyboard module 22 may assign one or more characters or operations to each key of the plurality of keys in the keyboard layout. For instance, keyboard module 22 may generate a QWERTY keyboard layout including keys that represent characters used in typing the English language. The QWERTY keyboard layout may also include keys that represent operations used in typing the English language (e.g., backspace, delete, spacebar, enter, etc.).

Keyboard module 22 may receive data from UI module 20 that represents the sequence of touch events generated by gesture module 24. Keyboard module 22 may also receive data from UI module 20 that represents locations of UID 12 where UID 12 presents each of the keys of graphical keyboard 16B. Keyboard module 22 may determine, based on the locations of the keys, that the sequence of touch events represents a selection of one or more keys. Keyboard module 22 may generate a character string based on the selection where each character in the character string corresponds to at least one key in the selection. Keyboard module 22 may send data indicating the character string to UI module 20 for inclusion in edit region 16A of user interface 14.

To determine the sequence of touch events represents a selection of one or more keys, keyboard module 22 may include a spatial model. In general, a spatial model may generate one or more probabilities that a particular key of a graphical keyboard has been selected based on location data associated with a user input. In some examples, a spatial model includes a bivariate Gaussian model for a particular key. The bivariate Gaussian model for a key may include a distribution of coordinates (e.g., (x, y) coordinate pairs) that correspond to locations of UID 12 that present the given key. More specifically, in some examples, a bivariate Gaussian model for a key may include a distribution of coordinates that correspond to locations of UID 12 that are most frequently selected by a user when the user intends to select the given key. A shorter distance between location data of a user input and a higher density area of the spatial model, the higher the probability that the key associated with the spatial model has been selected. A greater distance between location data of a user input and a higher density area of the spatial model, the lower the probability that the key associated with the spatial model has been selected. The spatial model of keyboard module 22 may compare the location components (e.g., coordinates) of one or more touch events in the sequence of touch events to respective locations of one or more keys of graphical keyboard 16B and generate a probability based on these comparisons that a selection of a key occurred.

For example, the spatial model of keyboard module 22 may compare the location component of each touch event in the sequence of touch events to a key location of a particular key of graphical keyboard 16B. The location component of each touch event in the sequence may include one location of UID 12 and a key location (e.g., a centroid of a key) of a key in graphical keyboard 16B may include a different location of UID 12. The spatial model of keyboard module 22 may determine a Euclidian distance between the two locations and generate a probability based on the Euclidian distance that the key was selected. The spatial model of keyboard module 22 may correlate a higher probability to a key that shares a smaller Euclidian distance with one or more touch events than a key that shares a greater Euclidian distance with one or more touch events. Based on the spatial model probability associated with each key, keyboard module 22 may assemble the individual key selections with the highest spatial model probabilities into a time-ordered sequence of keys that keyboard module 22 may then determine represents a character string.

Keyboard module 22 may determine a sequence of characters and keyboard operations from the sequence of keys to determine a character string represented by the sequence of touch events. For example, each key of the keyboard may represent a character or a keyboard operation. Keyboard module 22 may determine, based on the sequence of keys, particular characters represented by one or more key selections. A character such as a number or a lowercase letter may require a single character key selection (e.g., <letter-key>, <number-key>, etc.) and a character such as a capitalized letter may require two key selections (e.g., <shift-key>+<letter-key>, etc.).

Keyboard module 22 may access a lexicon of computing device 10 to autocorrect (e.g., spellcheck) the character string generated from the sequence of keys before outputting the character string to UI module 20 for inclusion within edit region 16A of user interface 14. The lexicon is described in more detail below. In summary, the lexicon of computing device 10 may include a list of words within a written language vocabulary. Keyboard module 22 may perform a lookup in the lexicon, of a character string, to identify one or more candidate words that include parts or all of the characters of the character string. Each candidate word may include a candidate word probability that indicates a likelihood the user input actually represents a selection of keys to input the candidate word in edit region 16A. In other words, the one or more candidate words may represent alternative spellings or arrangements of the characters in the character string based on a comparison with words within the lexicon.

For example, keyboard module 22 may determine the selection of keys corresponds to the sequence of letters s-a-t-o-k and as such, keyboard module 22 may determine the character string satok from this sequence of letters. Keyboard module 22 may compare the string satok to one or more words in the lexicon. In some examples, techniques of this disclosure may use a Jaccard similarity coefficient that indicates a degree of similarity between a character string inputted by a user and a word in the lexicon. In general, a Jaccard similarity coefficient, also known as a Jaccard index, represents a measurement of similarity between two sample sets (e.g., a character string and a word in a dictionary). Based on the comparison, keyboard module 22 may generate a Jaccard similarity coefficient for one or more words in the lexicon. Keyboard module 22 may determine one or more candidate words of the lexicon with a greatest Jaccard similarity coefficient (e.g., satin, sarin, say ok, etc.). Each candidate word may represent an alternative arrangement of some or all of the characters in the character string.

Keyboard module 22 may determine that the candidate word with the highest Jaccard similarity coefficient represents the autocorrected character string that keyboard module 22 outputs to UI module 20 for inclusion in edit region 16A. In some examples, the candidate word with the highest Jaccard similarity coefficient matches the character string generated by keyboard module 22 from the key sequence (e.g., the lexicon may return satin as the highest ranking candidate word since the arrangement of the characters in satin correspond to a word in the lexicon).

Rather than relying only on a lexicon to determine and output a character string in response to a user input, techniques of the disclosure use a plurality of characteristics associated with the user input to determine if the user input represents a selection of keys for entering an OOV word. In other words, in some instances, these techniques may determine that a selection of keys actually represents a character string not included in a lexicon. To improve the accuracy with which a computing device decides whether to output an OOV word, techniques of the disclosure determine, based on at least one characteristic of the user input, a spatial model probability associated with the one or more keys to determine whether that the user input corresponds to a selection of keys for entering an OOV word.

The techniques are now further described in detail with reference to FIG. 1. In the example of FIG. 1, computing device 10 outputs for display graphical keyboard 16B comprising a plurality of keys. For example, keyboard module 22 may generate data that includes a representation of graphical keyboard 16B. UI module 20 may generate user interface 14 and include graphical keyboard 16B in user interface 14 based on the data representing graphical keyboard 16B. UI module 20 may send information to UID 12 that includes instructions for displaying user interface 14 at UID 12. UID 12 may receive the information and cause UID 12 to present user interface 14 including edit region 16A, graphical keyboard 16B, and suggested word region 16C. Graphical keyboard 16B may include a plurality of keys.

Computing device 10 may receive an indication of a gesture detected at a presence-sensitive input device. For example, as UID 12 presents user interface 14, a user may provide gesture user input 30 (or simply "gesture" 30) at a location of UID 12 where UID 12 presents graphical keyboard 16B. FIG. 1 illustrates a path of gesture 30 including portions 34A-34J of the path of gesture 30 (collectively "portions" 34) that each represent a portion or subsection of the path of gesture 30. For example, portion 34A represents a beginning portion of gesture 30, portion 34J represents an ending portion of gesture 30, and portions 34B-34I each represent mid-portions of gesture 30. Each of portions 34 are delimited by dashed circles in FIG. 1 for example purposes, although UI device 12 may not output such dashed circles in some examples, and such portions may be larger and/or smaller in various different examples.

Gesture module 24 may receive information indicating gesture 30 from UID 12 and assemble the information into a time-ordered sequence of touch events (e.g., each touch event including a location component, a time component, and an action component). Gesture module 24 may determine one or more characteristics of gesture 30 and include information about the one or more characteristics as a characteristic component of each touch event in the sequence. For instance, gesture module 24 may determine a speed, a direction, a density, and/or a curvature of one or more portions 34 based on corresponding touch events related to each of portions 34. For the one or more touch events in the sequence of touch events related to portions 34, gesture module 24 may include a characteristic component which contains information about the one or more characteristics of a respective one of portions 34 of gesture 30. Gesture module 24 may output the sequence of touch-events of gesture 30 to UI module 20 and keyboard module 22.

Computing device 10 may determine one or more keys from the plurality of keys based at least in part on the indication of gesture 30 and at least one characteristic of gesture 30. For example, UI module 20 may receive the sequence of touch events from gesture module 24 and determine location components of each touch event in the sequence corresponding to an area of UID 12 that presents graphical keyboard 16B. UI module 20 may determine UID 12 received an indication of a selection of one or more of the plurality of keys. UI module 20 may transmit the sequence of touch events to keyboard module 22 along with the associated characteristics of gesture 30 and locations where UID 12 presents each of the keys of graphical keyboard 16B. Keyboard module 22 may receive the sequence of touch events along with the information associated with each touch event (e.g., location, time, action, and characteristic information) from UI module 20.

Keyboard module 22 may compare the location component of each touch event in the sequence of touch events to each key location to determine one or more keys that share the same approximate locations of UID 12 as the locations of touch events in the sequence of touch events. For example, using a spatial model, keyboard module 22 may determine a Euclidian distance between the location components of one or more touch events and the location of each key. Based on these Euclidian distances, and for each key, keyboard module 22 may determine a spatial model probability that the one or more touch events corresponds to a selection of the key. Keyboard module 22 may include each key with a non-zero spatial model probability (e.g., a key with a greater than zero percent likelihood that gesture 30 represents a selection of the key) in a sequence of keys.

Keyboard module 22 may associate each key in the sequence of keys with the information related to the one or more corresponding touch events used by the spatial model to determine a percent likelihood that gesture 30 represents a selection of the key. For example, keyboard module 22 may associate the location component, the time component, the action component and the characteristic component of one or more touch events in the sequence of touch events with a corresponding key in the sequence. If more than one touch event corresponds to a key, keyboard module 22 may combine (e.g., average) similar components of the multiple touch events into a single corresponding component, for instance, a single characteristic component that includes information about a portion of gesture 30 used to select the key. In other words, each key in the sequence of keys may inherit the information about the characteristics of gesture 30 from the one or more corresponding touch events from which the key was derived. In the example of FIG. 1, keyboard module 22 may determine a non-zero spatial model probability associated with each key along the path of gesture 30 and generate an ordered sequence of keys including the <S-key>, <A-key>, <S-key>, <R-key>, <T-key>, <Y-key>, <U-key>, <I-key>, <O-key>, and <K-key>. Each key in the sequence also includes information about the characteristics of respective portions 34A-34J of gesture 30.

Even though the spatial model probability associated with each key in the sequence of keys may include a non-zero spatial model probability, each key in the sequence of keys may or may not actually correspond to a user-intended selection of a key along the path of gesture 30. For example, when first selecting the <A-key> and then second selecting the <T-key> using graphical keyboard 16B, a user may inadvertently gesture at or near the <S-key>, <E-key>, <D-key>, and <R-key> when gesturing from the <A-key> to the <T-key>. Although the user may intend to select just the <A-key> and <T-key>, each of these intermediate keys (e.g., <S-key>, <E-key>, <D-key>, and <R-key>) along the path of gesture 30 may have, for example, a non-zero spatial model probability. As such, each key with a non-zero spatial model probability may or may not actually correspond to a user intended selection of a key.

Keyboard module 22 may utilize at least one characteristic associated with gesture 30 to refine the spatial model probability associated with each key in the sequence of keys to determine a refined sequence of keys. For example, as described above, each key in the sequence of keys includes a characteristic component that includes information about one or more characteristics of a portion of gesture 30. For instance, each key in the sequence may include characteristic information, e.g., about the speed, the direction, the density, and the curvature of a respective portion of gesture 30. In some examples, keyboard module 22 may compare the characteristic information of each key in the sequence of keys to one or more thresholds and adjust the spatial model probability associated with each key in the sequence of keys based whether the characteristic information of each key satisfies these thresholds. In other words, keyboard module 22 may determine one or more characteristics of a portion of a gesture more likely indicates a selection of a key of graphical keyboard 16B than simply movement at or near an intermediate (e.g., not selected) key.

In the example of FIG. 1, keyboard module 22 may determine the first key in the sequence of keys is the <S-key> and the characteristic information associated with this first key corresponds to portion 34A of gesture 30. The characteristic information associated with the other keys in the sequence of keys (e.g., <A-key>, <S-key>, <R-key>, <T-key>, <Y-key>, <U-key>, <I-key>, <O-key>, and <K-key>) corresponds to portion 34B through portion 34J respectively.

Keyboard module 22 may compare the characteristic information of each key with a characteristic threshold and increase or decrease the spatial model probability associated with the key accordingly, i.e., depending on whether the characteristic information satisfies the characteristic threshold or not. For example, keyboard module 22 may increase the spatial model probability associated with a key by modifying the spatial model probability from a lower probability value to a higher probability value (e.g., a modification to increase the spatial model probability may alter a spatial model probability value from fifty percent to a value of sixty percent). Keyboard module 22 may decrease the spatial model probability associated with a key by modifying the spatial model probability from a higher probability value to a lower probability value (e.g., a modification to decrease the spatial model probability may alter a spatial model probability value from fifty percent to a value of forty percent). Other examples of increasing and/or decreasing a spatial model probability may include modifications to a spatial model probability value other example percentage values.

In some examples, the characteristic information of a key may include a speed of a portion of gesture 30. In response to determining the speed of the portion of gesture 30 satisfies a speed threshold (e.g., if a value associated with the speed exceeds a value associated with the speed threshold, is less than a value associated with the speed threshold, etc.), keyboard module 22 may decrease the spatial model probability associated with the key. However in response to determining the speed does not satisfy the speed threshold (e.g., if a value attributed to the speed is less than a value associated with the speed threshold, greater than the value associated with the speed threshold, etc.) keyboard module 22 may increase the spatial model probability associated with the key. For example, keyboard module 22 may determine a slow moving portion of a gesture at or near a key of graphical keyboard 16B more likely indicates a selection of the key rather than a fast moving portion of a gesture that more likely indicates movement over an intermediate key and as such, keyboard module 22 may increase the spatial model probability of a key associated with a slow moving portion of a gesture.

In some examples, the characteristic information of a key may include a density of a portion of gesture 30. In response in response to determining the density satisfies a density threshold, keyboard module 22 may increase a spatial model probability associated with the key. However in response to determining the density does not satisfy the density threshold, keyboard module 22 may decrease the spatial model probability associated with the key. Keyboard module 22 may determine a dense portion of a gesture (e.g., a portion of a gesture with a large number of associated touch events) at or near a key of graphical keyboard 16B more likely indicates a selection of the key rather than a less dense portion of a gesture that more likely indicates movement over an intermediate key.

In some examples, the characteristic information of a key may include a curvature of a portion of gesture 30. In response in response to determining the curvature satisfies a curvature threshold, keyboard module 22 may increase a spatial model probability associated with the key. However in response to determining the curvature does not satisfy the curvature threshold, keyboard module 22 may decrease the spatial model probability associated with the key. Keyboard module 22 may determine a portion of a gesture with a high degree of curvature (e.g., an inflection point) at or near a key of graphical keyboard 16B more likely indicates a selection of the key rather than a portion of a gesture with a lesser degree of curvature (e.g., a straight segment) that more likely indicates movement over an intermediate key.

In some examples, the characteristic information of a key may include a direction of a portion of gesture 30. Keyboard module 22 may compare the direction of the portion to the direction of a second portion, for instance, the direction associated with a next key in the sequence of keys. In response to determining the direction of the portion approximately corresponds to the direction of the next portion, keyboard module 22 may decrease the spatial model probability associated with the key. For example, the direction of a portion may correspond to an angle measurement relative to a horizontal and/or vertical axis of UID 12. Keyboard module 22 may determine the direction of the next portion deviates five degrees, ten degrees, etc. from the direction of the first portion. In some examples, keyboard module 22 may determine that the direction of the next portion deviates from the direction of the first portion by five pixels, ten pixels, etc. as the direction of the first portion may correspond to a straight-line path. Any suitable angular or pixel values may be used by keyboard module 22 to determine whether the direction of one portion deviates from the direction of another portion. However, in response to determining the direction of the portion does not approximately correspond to the direction of the next portion, keyboard module 22 may increase the spatial model probability associated with the key. Keyboard module 22 may determine that a portion of a gesture with a direction similar to a preceding portion or a succeeding portion of the gesture more likely indicates movement over an intermediate key than a selection of the key.

After adjusting the spatial model probability associated with each key in the sequence of keys, keyboard module 22 may modify the sequence of keys based on the adjusted spatial model probabilities of each key to determine a refined sequence of keys. For instance, keyboard module 22 may compare the adjusted spatial model probability of each key with a probability threshold (e.g., fifty percent). Keyboard module 22 may remove each key from the sequence of keys that does not comprise a spatial model probability that exceeds the probability threshold and retain each key in the sequence of keys that does comprise a spatial model probability that exceeds the probability threshold. In this way, keyboard module 22 determines a refined sequence of keys based at least in part on the indication and at least one characteristic of gesture 30. In the example of FIG. 1, the refined sequence of keys includes <S-key>, <A-key>, <T-key>, <O-key>, and <K-key>.

Computing device 10 may determine a character string based on the one or more keys from the plurality of keys. For example, keyboard module 22 may determine a character string that represents the refined sequence of keys. Keyboard module 22 may concatenate each character represented by each of the keys in the refined sequence of keys to generate a character string. For example, keyboard module 22 may determine the refined sequence of keys represents the character string satok based on a sequential selection of the <S-key>, <A-key>, <T-key>, <O-key>, and <K-key> of graphical keyboard 16B.

In response to determining that the character string is not included in a lexicon and a spatial model probability associated with the one or more keys from the plurality of keys exceeds a probability threshold, computing device 10 may output the character string for display. For example, keyboard module 22 may autocorrect or predict a candidate word or phrase to include in edit region 16A from the selection of keys entered by gesture 30 at graphical keyboard 16B. Keyboard module 22 may determine one or more candidate words or phrases based at least in part on the character string. For example, keyboard module 22 may utilize a lexicon to generate the one or more candidate words or phrases that share a similar sequence of characters as the character string (e.g., satok). Keyboard module 22 may pass the character string as input to the lexicon and receive one or more candidate words that include a portion of or all of the characters within the character string. For example, the lexicon may assign a Jaccard similarity coefficient to each word or phrase in the lexicon based on a comparison between each word or phrase and the character string. Keyboard module 22 may select, as the one or more candidate words or phrases, the words or phrases from the lexicon having the greatest Jaccard similarity coefficient (e.g., satin, sarin, say ok, satine, satisfy, etc.) and assign a ranking to each of the words or phrases with the highest ranking word or phrase having the greatest Jaccard similarity coefficient and the lowest ranking word or phrase having the lowest Jaccard similarity coefficient word or phrase.

Keyboard module 22 may output the one or more candidate words or phrases and associated rankings to UI module 20 for inclusion either in edit region 16A of user interface 14, or as individual suggested words 38 in suggested word region 16C of user interface 14. In the event that none of the one or more candidate words or phrases determined from the lexicon actually represents the word or phrase the user intended to enter when providing gesture 30, keyboard module 22 may include the raw character string generated from the refined sequence of keys as one of the one or more candidate words. For example, each of the keys in the refined sequence of keys includes spatial model probability that exceeds the probability threshold. In the event that the user intended to enter an OOV word or phrase (e.g., a word or phrase not included in the lexicon) keyboard module 22 may include this raw character string as one of the one or more candidate words or phrases.

UI module 20 may receive the one or more candidate words or phrases (including the raw character string) from keyboard module 22 along with a rank of the one or more candidate words or phrases. UI module 20 may update user interface 14 to include the highest ranking candidate word or phrase in edit region 16A. UI module 20 may update suggested word region 16C by including the next highest ranking candidate words as suggested words 38A and 38B. In the event that the user intended to input an OOV word or phrase with gesture 30, UI module 20 may include the raw character string in suggested word region 16C as suggested word 38C. UI module 20 may cause UID 12 to output for display updated user interface 14, including causing UID 12 to output the raw character string as suggested word 38C. From updated user interface 14, the user can select one of suggested words 38 by tapping or providing an input at a location of UID 12 where UID 12 outputs suggested word region 16C. For example, the user tap over the location of UID 12 where UID 12 presents suggested word 38C, e.g., satok. Tapping over suggested word 38C may cause UI module 20 to update user interface 14 and include the OOV word satok in edit region 16A.

In this way, the techniques of the disclosure may enable a computing device to receive OOV words or phrases based on a gesture input entered at a graphical keyboard. The techniques of the disclosure may enable a computing device to more accurately determine a character string, not just using a lexicon and/or spatial model, but in addition based on one or more characteristics of a gesture input. The techniques may further enable a user to more quickly enter character strings at a computing device since the user may provide fewer inputs to correct the computing device or individually tapping at keys to enter OOV words. A computing device such as this may process fewer user inputs, execute fewer operations, and as a result, consume less electrical power.

Figure 2:
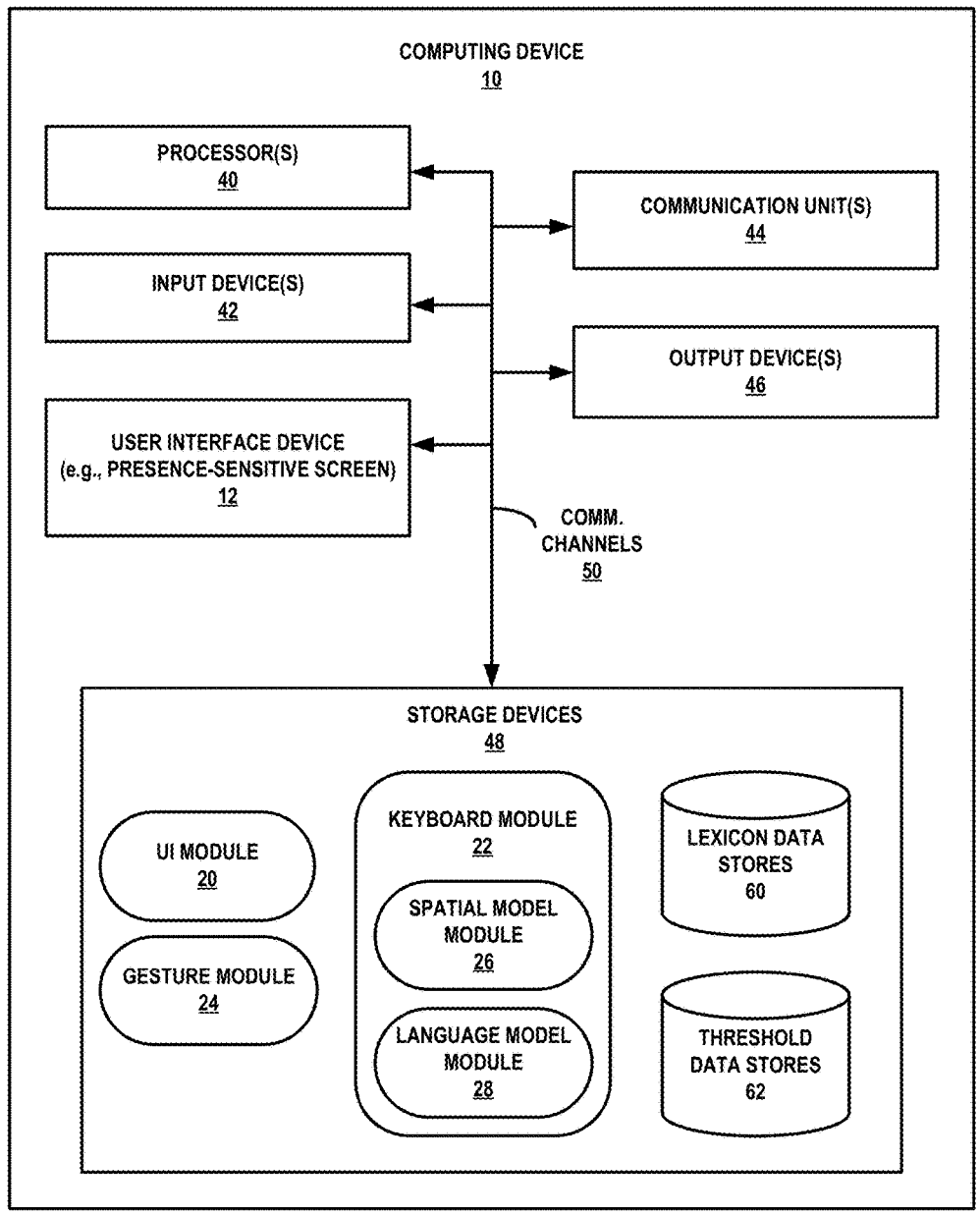
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. FIG. 2 illustrates only one particular example of computing device 10, and many other examples of computing device 10 may be used in other instances and may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, keyboard module 22, gesture module 24, lexicon data stores 60, and threshold data stores 62. Keyboard module 22 includes spatial model module 26 ("SM module 26"), language model module 28 ("LM module 28"). Communication channels 50 may interconnect each of the components 12, 13, 20, 22, 24, 26, 28, 40, 42, 44, 46, 60, and 62 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive input device (e.g., a touch sensitive screen, a presence-sensitive display), mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near the presence-sensitive input device. As one example range, a presence-sensitive input device may detect an object, such as a finger or stylus that is within 2 inches or less of the presence-sensitive input device. The presence-sensitive input device may determine a location (e.g., an (x,y) coordinate) of the presence-sensitive input device at which the object was detected. In another example range, a presence-sensitive input device may detect an object 6 inches or less from the presence-sensitive input device and other ranges are also possible. The presence-sensitive input device may determine the location of the input device selected by a user's finger using capacitive, inductive, and/or optical recognition techniques. In some examples, presence sensitive input device provides output to a user using tactile, audio, or video stimuli as described with respect to output device 46. In the example of FIG. 2, UID 12 presents a user interface (such as user interface 14 of FIG. 1) at UID 12.

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., lexicon data stores 60 of computing device 10 may store data related to one or more written languages, such as words and common pairings of words, accessed by LM module 28 during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, keyboard module 22, gesture module 24, SM module 26, LM module 28, lexicon data stores 60, and threshold data stores 62.

One or more processors 40 may implement functionality and/or execute instructions within computing device 10. For example, processors 40 on computing device 10 may receive and execute instructions stored by storage devices 48 that execute the functionality of UI module 20, keyboard module 22, gesture module 24, SM module 26, and LM module 28. These instructions executed by processors 40 may cause computing device 10 to store information, within storage devices 48 during program execution. Processors 40 may execute instructions of modules 20-28 to cause UID 12 to display user interface 14 with edit region 16A, graphical keyboard 16B, and suggested word region 16C at UID 12. That is, modules 20-28 may be operable by processors 40 to perform various actions, including receiving an indication of a gesture at locations of UID 12 and causing UID 12 to present user interface 14 at UID 12.

In accordance with aspects of this disclosure computing device 10 of FIG. 2 may output for display at UID 12, a graphical keyboard including a plurality of keys. For example during operational use of computing device 10, UI module 20 of computing device 10 may query keyboard module 22 for a keyboard layout (e.g., an English language QWERT keyboard, etc.). UI module 20 may transmit a request for a keyboard layout over communication channels 50 to keyboard module 22. Keyboard module 22 may receive the request and reply to UI module 20 with data associated with the keyboard layout. UI module 20 may receive the keyboard layout data over communication channels 50 and use the data to generate user interface 14. UI module 20 may generate user interface 14 including edit region 16A and the plurality of keys of the keyboard layout from keyboard module 22 as graphical keyboard 16B. UI module 20 may transmit a display command and data over communication channels 50 to cause UID 12 to present user interface 14 at UID 12. UI module 20 may send information to UID 12 that includes instructions for displaying user interface 14 at UID 12. UID 12 may receive the display command and data from UI module 20 and cause UID 12 to present user interface 14.

Computing device 10 may receive an indication of gesture 30 detected at UID 12. Receiving the indication of gesture 30 detected at UID 12 may comprise receiving an indication of one or more tap gestures detected at UID 12. Alternatively, receiving the indication of gesture 30 detected at UID 12 may comprise receiving an indication of one or more non-tap gestures detected at UID 12. In other words, a user may provide tap and/or non-tap gestures as input to computing device 10 and computing device 10 may receive either type of input as an indication of a gesture.

For example, a user of computing device 10 may provide gesture 30 at UID 12 by tapping and/or swiping at locations of UID 12 that present the keys of graphical keyboard 16B. UID 12 may receive gesture 30 detected at UID 12 and send information about gesture 30 over communication channels 50 to gesture module 24. UID 12 may virtually overlay a grid of coordinates onto UID 12. The grid may not be visibly displayed by UID 12. The grid may assign a coordinate that includes a horizontal component (X) and a vertical component (Y) to each location. Each time UID 12 detects a gesture input, such as gesture 30, gesture module 24 may receive information from UID 12. The information may include one or more coordinate locations and associated times indicating to gesture module 24 both, where UID 12 detects the gesture input at UID 12, and when UID 12 detects the gesture input.

Computing device 10 may define, based at least in part on a portion of gesture 30, a sequence of touch events. Each touch event in the sequence of touch events may comprise a time that indicates when the portion of the gesture is received and a coordinate of a location at UID 12 where the portion of the gesture is received. In other words, gesture module 24 may order the information received from UID 12 into a time-ordered sequence of touch events. The sequence of touch events may represent portions 34 of the path of gesture 30 performed by the user at UID 12. Each touch event in the sequence may include a location component as the coordinate location of portions 34 of the path of gesture 30, a time component as the time associated with portions 34 of the path of gesture 30, and an action component associated with portions 34 of the path of gesture 30. The action component may indicate whether the touch event corresponds to a push down at UID 12 or a lift up at UID 12.

Gesture module 24 may determine one or more characteristics of gesture 30 and include information about the one or more characteristics as a characteristic component of each touch event in the sequence. For instance, gesture module 24 may determine a speed, a direction, a density, and/or a curvature of one or more portions 34 based on corresponding touch events related to each of portions 34.

Gesture module 24 may determine the speed of one or more portions 34 by determining a ratio between a distance between the location components of two or more touch events in the sequence and a difference in time between the two or more touch events in the sequence. For example, to determine the speed of portion 34A of gesture 30, gesture module 24 may isolate two touch events corresponding to portions 34A. Gesture module 24 may determine a distance between the location components of the two touch events. Gesture module 24 may determine a time difference between the time components of the two touch events. Gesture module 24 may determine the speed of portion 34A as a ration between the distance and the time difference associated with the two touch events.

Gesture module 24 may determine the direction of one or more portions 34. In other words, gesture module 24 may determine if, based on changes in the location components to two or more touch events in the sequence, the one or more portions 34 represent a direction of movement across UID 12. For example, gesture module 24 may isolate two touch events corresponding to portions 34A. Gesture module 24 may determine a difference between the (x,y) coordinate values of the location components of these two touch events and based on the difference, assign a direction (e.g., left, right, up, down, etc.) to portion 34A. In one example, a negative difference in x coordinates may correspond to a right-to-left direction of portion 34A. A positive difference in x coordinates may represent a left-to-right direction of portion 34A. Similarly, a negative difference in y coordinates may correspond to a bottom-to-top direction of portion 34A. A negative difference in y coordinates may represent a top-to-bottom direction of portion 34A.

Gesture module 24 may determine the density of one or more portions 34. In other words, gesture module 24 may determine, based on the sequence of touch events, a density associated with the sequence of touch events over a time duration. The density may represent a quantity of touch events each having location components that are collocated in an area of UID 12. To determine the density of the touch events associated with portion 34B of gesture 30, gesture module 24 may determine a ratio between the quantity of touch events associated portion 34B and a physical area of UID 12 that bounds portion 34B. Gesture module 24 may determine a quantity of touch events associated with portion 34B in the sequence of touch events. Based on the locations of one or more touch events in the sequence, gesture module 24 may determine a minimum area A (e.g., A square pixels, A square inches, etc.) that bounds the locations of the one or more touch events in the sequence. Gesture module 24 may determine that the density of the touch events associated with portion 34B comprises a ratio between the quantity of touch events in the sequence and the area A (e.g., number of touch events within portion 34A divided by area A).

In some examples, gesture module 24 may modify the sequence of touch events if the density of one or more touch events satisfies a threshold. For instance, gesture module 24 may utilize a filtering technique and a density threshold stored at threshold data stores 62 to minimize redundant touch events in the sequence (e.g., excessive touch events that do not uniquely define a characteristic or path of gesture 30), if the density of touch events in a given portion of gesture 30 exceeds the density threshold. Gesture module 24 may remove, average, etc. one or more touch events from the sequence if the density of the touch events satisfies the density threshold. Filtering the sequence of touch events based on the density may increase performance of other modules (e.g., UI module 20 and keyboard module 22) since the other modules may perform less operations on a filtered sequence of touch events than a non-filtered sequence.

Gesture module 24 may determine the curvature of one or more portions 34. In other words, gesture module 24 may determine a degree of deviation between the location components of two or more touch events in one or more portions 34 from a single linear plane. For example, to determine the curvature of portion 34B of gesture 30, gesture module 24 may isolate three touch events corresponding to portions 34B. Gesture module 24 may determine a degree of deviation of the location components of the three touch events to a common linear plane between the three touch events. A high degree of curvature may correspond to a high degree of deviation (e.g., an inflection point in a portion of gesture 30) and a low degree of curvature, e.g., a near zero value of curvature, may correspond to a low or near zero deviation (e.g., a straight portion of the path of gesture 30).

For the one or more touch events in the sequence of touch events related to portions 34, gesture module 24 may include a characteristic component which contains information about the one or more characteristics of a respective one of portions 34 of gesture 30. For instance, one or more touch events in the sequence may include a curvature component, a direction component, a speed component, and a density component. Gesture module 24 may output the sequence of touch-events (including these characteristic components) of gesture 30 to UI module 20. For example, after determining one or more characteristics of portions 34 of gesture 30, gesture module 24 may transmit the sequence of touch events over communication channels 50 to UI module 20.

Computing device 10 may determine, based at least in part on the indication of gesture 30 and at least one characteristic of gesture 30, one or more keys from the plurality of keys of graphical keyboard 16B. For example, UI module 20 may receive the sequence of touch events transmitted over communication channels 50 from gesture module 24 and determine that location components of each touch event in the sequence correspond to an area of UID 12 that presents graphical keyboard 16B. UI module 20 may determine UID 12 received an indication of a selection of one or more of the plurality of keys. In response, UI module 20 may transmit the sequence of touch events over communication channels 50 to keyboard module 22 along with the associated characteristics of gesture 30 and locations where UID 12 presents each of the keys of graphical keyboard 16B. Keyboard module 22 may receive the sequence of touch events along with the information associated with each touch event (e.g., location, time, action, and characteristic information) from UI module 20.

Keyboard module 22 may compare the location component of one or more touch events in the sequence of touch events to each key location to determine one or more keys that share the same approximate locations of UID 12 as the locations of touch events in the sequence of touch events. For example, using SM module 26, keyboard module 22 may determine a Euclidian distance between the location components of one or more touch events and the location of each key. Based on these Euclidian distances for each key, SM module 26 of keyboard module 22 may determine a spatial model probability that the one or more touch events corresponds to a selection of the key. In other words, SM module 26 may compare the location components of each touch event in the sequence of touch events to each key location, and for each key, generate a spatial model probability that a selection of the key occurred.

The location components of one or more touch events in the sequence may include one or more locations of UID 12. A key location (e.g., a centroid of a key) may include a different location of UID 12. SM module 26 may determine a probability that one or more touch events in the sequence correspond to a selection of a key based on a Euclidian distance between the key location and the one or more touch event locations. SM module 26 may correlate a higher probability to a key that shares a smaller Euclidian distance with location components of the one or more touch events than a key that shares a greater Euclidian distance with location components of the one or more touch events (e.g., the probability of a key selection may exceed ninety nine percent when a key shares a near zero Euclidian distance to a location component of one or more touch events and the probability of the key selection may decrease proportionately with an increase in the Euclidian distance).

Based on the spatial model probability associated with each key, keyboard module 22 may assemble the individual key selections with the highest spatial model probabilities into a time-ordered sequence of keys. In other words, keyboard module 22 may include each key with a non-zero spatial model probability (e.g., a key with a greater than zero percent likelihood that gesture 30 represents a selection of the key) in a sequence of keys.

Keyboard module 22 may associate each key in the sequence of keys with the information related to the one or more corresponding touch events used by SM module 26 to determine the greater than zero percent likelihood that gesture 30 represents a selection of the key. For example, keyboard module 22 may associate the location component, the time component, the action component and the characteristic component of one or more touch events in the sequence of touch events with a corresponding key in the sequence. If more than one touch event corresponds to a key, keyboard module 22 may combine (e.g., average) similar components of the multiple touch events into a single corresponding component, for instance, a single characteristic component that includes information about one or more portions 34 of gesture 30 used to select the key. In other words, each key in the sequence of keys may inherit the information about the characteristics of gesture 30 from the one or more corresponding touch events from which the key was derived. SM module 26 of keyboard module 22 may determine a non-zero spatial model probability associated with each key along the path of gesture 30 of FIG. 1 and generate an ordered sequence of keys including the <S-key>, <A-key>, <S-key>, <R-key>, <T-key>, <Y-key>, <U-key>, <I-key>, <O-key>, and <K-key>. Each key in the sequence also includes information about the characteristics of respective portions 34A-34J of gesture 30.

Although the spatial model probability associated with each key in the sequence of keys may include a non-zero spatial model probability, each key in the sequence of keys may or may not actually correspond to a user-intended selection of a key along the path of gesture 30. For example, when first selecting the <A-key> and then second selecting the <T-key> using graphical keyboard 16B, a user may inadvertently or intentionally gesture at or near the <S-key>, <E-key>, <D-key>, and <R-key> when gesturing from the <A-key> to the <T-key>. Although the user may intend to select just the <A-key> and <T-key>, each of these intermediate keys (e.g., <S-key>, <E-key>, <D-key>, and <R-key>) along the path of gesture 30 may have a non-zero spatial model probability. As such, each key with a non-zero spatial model probability may or may not actually correspond to a user intended selection of a key.

Keyboard module 22 may utilize at least one characteristic associated with gesture 30 to refine the spatial model probability associated with each key in the sequence of keys to determine a refined sequence of keys. For example, as described above, each key in the sequence of keys includes a characteristic component that includes information about one or more characteristics of portions 34 of gesture 30. Each key in the sequence may include characteristic information, e.g., about the speed, the direction, the density, and the curvature of a respective portion of gesture 30. In some examples, keyboard module 22 may compare the characteristic information of each key in the sequence of keys to one or more thresholds stored at threshold data stores 62 and adjust the spatial model probability associated with each key in the sequence of keys based whether the characteristic information of each key satisfies these thresholds. In other words, keyboard module 22 may determine one or more characteristics of portion 34 of gesture 30 that more likely indicate a selection of a single key of graphical keyboard 16B rather than simply indicating movement at or near an intermediate (e.g., not selected) key.

Carrying over the example of FIG. 1, keyboard module 22 may determine the first key in the sequence of keys is the <S-key> and the characteristic information associated with this first key corresponds to portion 34A of gesture 30. As indicated above, the characteristic information associated with the other keys in the sequence of keys (e.g., <A-key>, <S-key>, <R-key>, <T-key>, <Y-key>, <U-key>, <I-key>, <O-key>, and <K-key>) corresponds to portion 34B through portion 34J respectively. Keyboard module 22 may compare the characteristic information of each key with a characteristic threshold stored at threshold data stores 62 and increase or decrease the spatial model probability associated with the key accordingly, i.e., depending on whether the characteristic information satisfies the characteristic threshold or not. In some examples, keyboard module 22 may increase but not otherwise decrease a spatial model probability based on a threshold. In other examples, keyboard module 22 may decrease, but not otherwise increase a spatial model probability based on a threshold. The following adjustments to spatial model probabilities are given as one example and should not be in anyway construed as limiting.

In some examples, the characteristic information of a key may include a speed of a portion of gesture 30. In response to determining the speed of a portion 34 of gesture 30 satisfies a speed threshold stored at threshold data stores 62, keyboard module 22 may decrease the spatial model probability associated with the key. However in response to determining the speed does not satisfy the speed threshold stored at threshold data stores 62 (e.g., if a value attributed to the speed is less than a value associated with the speed threshold, greater than the value associated with the speed threshold, etc.) keyboard module 22 may increase the spatial model probability associated with the key. Keyboard module 22 may determine the speed of portions 34A, 34B, 34E, 34I and 34J does not satisfy the speed threshold of threshold data stores 62 and increase the spatial model probabilities associated with the first <S-key> in the sequence, the <A-key>, the <T-key>, the <O-key>, and the <K-key> respectively. Conversely, keyboard module 22 may determine the speed of portions 34C, 34D, 34F, 34G, and 34H does satisfy the speed threshold of threshold data stores 62 and as such, decrease the spatial model probabilities associated with the second <S-key> in the sequence, the <R-key>, the <Y-key>, the <U-key>, and the <I-key> respectively.

In some examples, the characteristic information of a key may include a density of a portion of gesture 30. In response in response to determining the density satisfies a density threshold stored at threshold data stores 62, keyboard module 22 may increase a spatial model probability associated with the key. However in response to determining the density does not satisfy the density threshold, keyboard module 22 may decrease the spatial model probability associated with the key. Keyboard module 22 may determine a dense portion of a gesture (e.g., a portion of a gesture with a large number of associated touch events) at or near a key of graphical keyboard 16B more likely indicates a selection of the key rather than a less dense portion of a gesture that more likely indicates movement over an intermediate key. Keyboard module 22 may determine the density of portions 34A, 34B, 34I and 34J does satisfy the density threshold of threshold data stores 62 and may increase the spatial model probabilities associated with the first <S-key> in the sequence, the <A-key>, the <O-key>, and the <K-key> respectively. Conversely, keyboard module 22 may determine the density of portions 34C, 34D, 34E, 34F, 34G, and 34H does satisfy the density threshold of threshold data stores 62 and as such, decrease the spatial model probabilities associated with the second <S-key> in the sequence, the <T-key>, the <R-key>, the <Y-key>, the <U-key>, and the <I-key> respectively.

In some examples, the characteristic information of a key may include a curvature of a portion of gesture 30. In response in response to determining the curvature satisfies a curvature threshold stored at threshold data stores 62, keyboard module 22 may increase a spatial model probability associated with the key. However in response to determining the curvature does not satisfy the curvature threshold stored at threshold data stores 62, keyboard module 22 may decrease the spatial model probability associated with the key. Keyboard module 22 may determine a portion of a gesture with a high degree of curvature (e.g., an inflection point) at or near a key of graphical keyboard 16B more likely indicates a selection of the key rather than a portion of a gesture with a lesser degree of curvature (e.g., a straight segment) that more likely indicates movement over an intermediate key. Keyboard module 22 may determine the curvature of portions 34B, 34E, and 34I do satisfy the curvature threshold of threshold data stores 62 and may increase the spatial model probabilities associated with the <A-key>, the <T-key>, and the <O-key> respectively. Conversely, keyboard module 22 may determine the density of portions 34A, 34C, 34D, 34E, 34F, 34G, 34H, and 34K do not satisfy the curvature threshold of threshold data stores 62 and as such, do nothing to the spatial model probabilities associated with the respective keys.

In some examples, the characteristic information of a key may include a direction of a portion of gesture 30. Keyboard module 22 may compare the direction of the portion to the direction of a second portion, for instance, the direction associated with a next key in the sequence of keys. In response to determining the direction of the portion approximately corresponds to the direction of the next portion, keyboard module 22 may decrease the spatial model probability associated with the key. However, in response to determining the direction of the portion does not approximately correspond to the direction of the next portion, keyboard module 22 may increase the spatial model probability associated with the key. Keyboard module 22 may determine that a portion of a gesture with a direction similar to a preceding portion or a succeeding portion of the gesture more likely indicates movement over an intermediate key than a selection of the key. For example, keyboard module 22 may determine a change in direction from portion 34B to portion 34C and as such increase the spatial model probability associated with the <A-key>, keyboard module 22 may determine no change from portions 34C through 34E and therefore decrease the spatial model probability associated with both the second <S-key> in the sequence and the <R-key>, etc.

After and/or when adjusting the spatial model probability associated with each key in the sequence of keys, keyboard module 22 may modify the sequence of keys based on the adjusted spatial model probabilities of each key to determine a refined sequence of keys. For instance, keyboard module 22 may compare the adjusted spatial model probability of each key with a probability threshold (e.g., fifty percent) stored at threshold data stores 62. Keyboard module 22 may remove each key from the sequence of keys that does not comprise a spatial model probability that exceeds the probability threshold and retain each key in the sequence of keys that does comprise a spatial model probability that exceeds the probability threshold. In this way, keyboard module 22 may determine a refined sequence of keys based at least in part on the indication and at least one characteristic of gesture 30. The refined sequence of keys based on gesture 30 may include the <S-key>, <A-key>, <T-key>, <O-key>, and <K-key>.

Computing device 10 may determine a character string based on the one or more keys from the plurality of keys. For example, keyboard module 22 may determine a character string that represents the refined sequence of keys. Keyboard module 22 may concatenate each character represented by each of the keys in the refined sequence of keys to generate a character string. For example, keyboard module 22 may determine the refined sequence of keys represents the character string satok based on a sequential selection of the <S-key>, <A-key>, <T-key>, <O-key>, and <K-key> of graphical keyboard 16B.

In response to determining that the character string is not included in a lexicon and a spatial model probability associated with the one or more keys from the plurality of keys exceeds a probability threshold, computing device 10 may output the character string for display. For example, keyboard module 22 may autocorrect or predict a candidate word or phrase to include in edit region 16A from the selection of keys entered by gesture 30 at graphical keyboard 16B. Keyboard module 22 may determine a plurality of candidate words or phrases based at least in part on the character string. Keyboard module 22 may utilize LM module 28 which uses one or more lexicons stored at lexicon data stores 60, to determine the plurality of candidate words in the one or more lexicons.

To generate the one or more candidate words or phrases that share a similar sequence of characters as the character string (e.g., satok). Keyboard module 22 may pass the character string as input to LM module 28. LM module 28 may look-up the character string in the one or more lexicons of lexicon data stores 60 and may receive one or more candidate words that include a portion of some or all of the characters within the character string. For example, one or more lexicons of lexicon data store 60 may assign a Jaccard similarity coefficient to each word or phrase in the lexicon based on a comparison between each word or phrase and the character string. LM module 28 may select and output the words and/or phrases with a highest Jaccard similarity coefficient to keyboard module 22, as one or more candidate words or phrases (e.g., satin, sarin, say ok, satine, satisfy, etc.). In addition, LM module 28 may assign a language model probability to each of the one or more candidate words and/or phrases that indicates a likelihood that the character string represents and incorrect spelling of each of the one or more candidate words and/or phrases. LM module 28 may output this language model probability to keyboard module 22 with each of the one or more candidate words and/or phrases. Keyboard module 22 may receive the words and/or phrases from LM module 28 and assign a ranking to each of the words and/or phrases (e.g., with the highest ranking word and/or phrase having the greatest language model probability and the lowest ranking word and/or phrase having the lowest language model probability).

Keyboard module 22 may output, over communication channels 50, the one or more candidate words and/or phrases and associated language model probabilities to UI module 20 for inclusion either in edit region 16A of user interface 14, or as individual suggested words 38 in suggested word region 16C of user interface 14. In the event that none of the one or more candidate words and/or phrases determined by LM module 28 actually represents the word or phrase the user intended to enter when providing gesture 30, keyboard module 22 may include the raw character string generated from the refined sequence of keys as one of the one or more candidate words. For example, in the event that the user intended to enter an OOV word and/or phrase (e.g., a word and/or phrase not included in one of the lexicons of lexicon data stores 60) keyboard module 22 may include this raw character string as one of the one or more candidate words and/or phrases to be outputted by computing device 10. Each of the keys in the refined sequence of keys includes a spatial model probability and if the spatial model probability associated with each of the keys in the sequence exceeds a probability threshold (indicating a strong correlation between the keys selected by gesture 30), keyboard module 22 may output the raw character string. In other words, in addition to outputting the one or more candidate words and/or phrases, keyboard module 22 may output the character string (e.g. the raw character string) if the spatial model probability associated with the character string exceeds a probability threshold, to UI module 20 to cause UID 12 to output the character string for display at UID 12.

UI module 20 may receive the one or more candidate words and/or phrases (including the raw character string) from keyboard module 22 along with a language model probability of the one or more candidate words and/or phrases. UI module 20 may update user interface 14 to include the highest ranking (based on the language model probability) candidate word and/or phrase in edit region 16C. UI module 20 may update suggested word region 16C by including the next highest ranking (based on the language model probability) candidate words as suggested words 38A and 38B. In the event that the user intended to input an OOV word and/or phrase with gesture 30, UI module 20 may include the raw character string in suggested word region 16C as suggested word 38C.

UI module 20 may cause UID 12 to output for display updated user interface 14, including causing UID 12 to output the raw character string as suggested word 38C. In other words, UI module 20 may send a command and instructions to UID 12 to cause UID 12 to output, for display, suggested word region 16C, including a plurality of suggested words 38 associated with gesture 30. Outputting the character string (e.g., the raw character string) by computing device 10 may comprise outputting the character string as one suggested word (e.g., suggested word 38C) of the plurality of suggested words 38.

Upon UI module 20 causing UID 12 to output updated user interface 14 with suggested words 38 (including the character string as suggested word 38C), a user may select one of suggested words 38 by tapping or providing an input at a location of UID 12 where UID 12 outputs suggested word region 16C. For example, the user tap over the location of UID 12 where UID 12 presents suggested word 38C, e.g., satok. Tapping over suggested word 38C may cause UI module 20 to update user interface 14 and include the OOV word satok in edit region 16A.

In some examples, UI module 20 may utilize a language model probability threshold to determine whether or not to include any of the candidate words as suggested words 38 in user interface 14. In other words, each suggested word of the plurality of suggested words that UI module 20 includes in suggested word region 16C is associated with a respective language model probability (determined by LM module 28) that indicates whether the each respective suggested word is included in one or more of the lexicons in lexicon data stores 60. Each respective language model probability associated with each suggested word in the plurality of suggested words 38 except the suggested word that corresponds to the character string (e.g., suggested word 38C) may satisfy a language model probability threshold. In this way, UI module 20 may utilize the language model probability associated with each of the one or more candidate words received from keyboard module 22 to determine whether or not the character string is included in one of the lexicons in lexicon data stores 60.

In some examples, in addition to relying on the spatial model probability associated with the raw character string to determine whether to output the character string for display, UI module 20 may rely on a spelling probability that the character string corresponds to an incorrect spelling of at least one of the plurality of candidate words. As described above, keyboard module 22, in conjunction with LM module 28, may determine, based at least in part on the character string, a plurality of candidate words in one or more of the lexicons of lexicon data stores 60. The language model probability associated with one or more of the candidate words may exceed a language model probability threshold, such that, keyboard module 22 may determine, based at least in part on the plurality of candidate words, a spelling probability that the character string corresponds to an incorrect spelling of at least one of the plurality of candidate words.

In other words, keyboard module 22 may determine that a high language model probability associated with one or more candidate words (e.g., exceeding ninety percent) indicates a high likelihood that the character string is not an OOV word, but instead likely corresponds to an incorrect spelling of the respective one or more candidate words. Keyboard module 22 may assign a spelling probability to the character string that indicates whether or not the character string is likely an incorrect spelling of the one or more candidate words from lexicon data stores 60. Keyboard module 22 may output the character string to UI module 20 (to cause UI module 20 to cause UID 12 to output the character string for display) only in response to determining that the spelling probability does not satisfy a spelling probability threshold (e.g., that the spelling probability of the character string is less than a spelling probability threshold stored at threshold data stores 60). In other words, keyboard module 22 may not output the character string to UI module 20, if the spelling probability of the character string does satisfy the spelling probability threshold and as such, indicates a likelihood that the character string is not an OOV word, but rather an incorrect spelling of one or more of the candidate words.

In some examples, UI module 20 may determine whether to output the character string based on the context, or category of text input, associated with the character string. For example, the category of text input associated with the character string may be one of a group comprising a portion of a name, a portion of an address, a portion of an electronic mail (e-mail) address, etc. Put another way, the character string may be part of a first or last name, a street, city, country, or other part of an address, or a part of an e-mail address and as such, more likely be an OOV word not included in one of the lexicons in lexicon data stores 60. UI module 20 may determine the category of text input associated with the character string and output the character string in response to determining the category of text input. UI module 20 may determine the category of text input based on information received, for example, from an application associated with user interface 14. In one example, user interface 14 may be associated with an electronic mail message application. UI module 20 may receive a command from the electronic mail message application to output user interface 14 and in addition receive information about different fields or edit regions of user interface 14. UI module 20 may determine the character string is associated with a portion of user interface 14 for typing the e-mail address of an intended recipient. If the category of text input associated with the character string is not a portion of a name, a portion of an address, a portion of an electronic mail (e-mail) address, etc. then UI module 20 may not include the character string as one of suggested words 38. If the category of text input associated with the character string is a portion of a name, a portion of an address, a portion of an electronic mail (e-mail) address, etc. then UI module 20 may include the character string as one of suggested words 38.

In this way, the techniques of the disclosure may enable a computing device to receive OOV words or phrases based on a gesture input entered at a graphical keyboard. The techniques of the disclosure may enable a computing device to more accurately determine a character string, not just using a lexicon and/or spatial model, but in addition based on one or more characteristics of a gesture input. The techniques may further enable a user to more quickly enter character strings at a computing device since the user may provide fewer inputs to correct the computing device or individually tapping at keys to enter OOV words. A computing device such as this may process fewer user inputs, execute fewer operations, and as a result, consume less electrical power.

Figure 3:
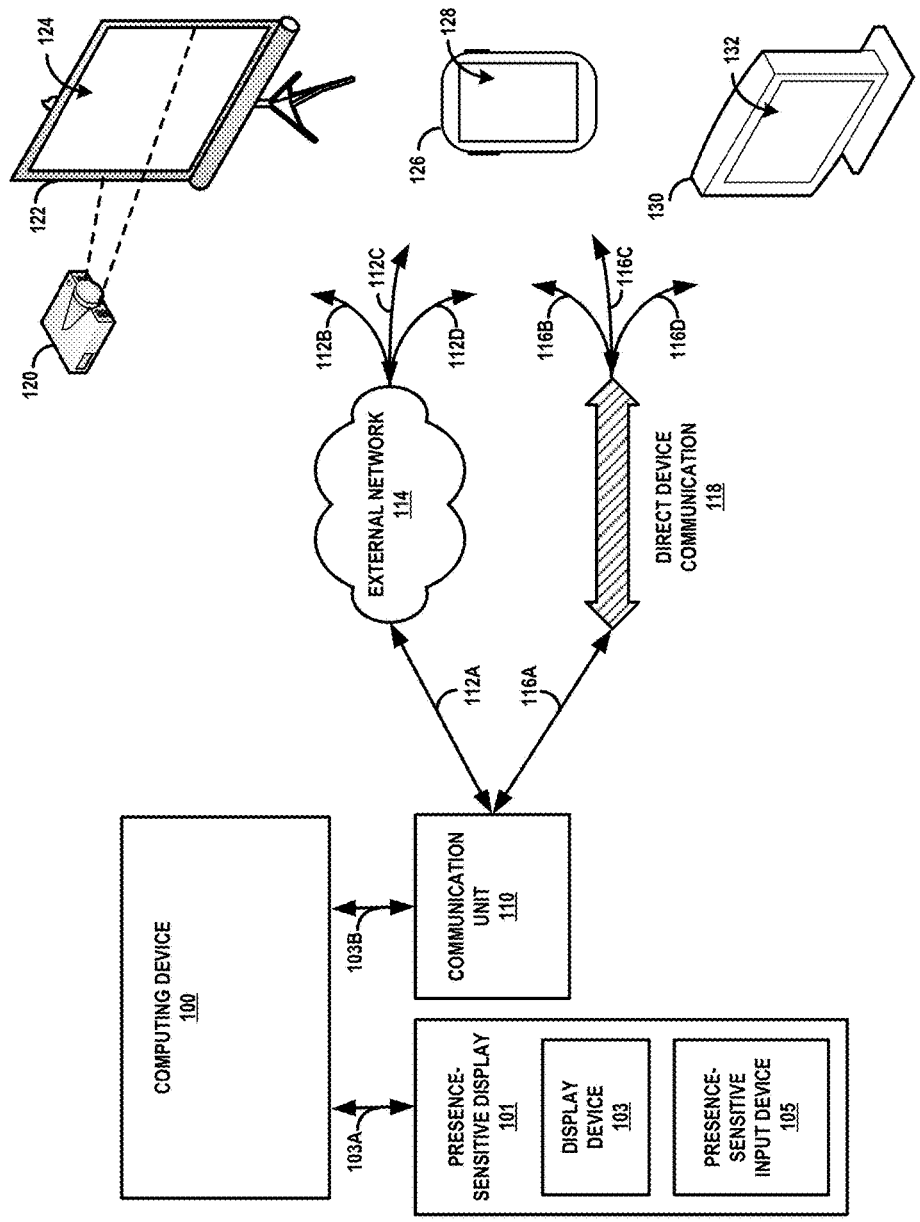
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, tablet device 126, and visual display device 130. Although shown for purposes of example in FIGS. 1 and 2 as a stand-alone computing device 10, a computing device such as computing device 100 and/or computing device 10 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 40 in FIG. 2. In such examples, computing device 100 may be operatively coupled to presence-sensitive display 101 by a communication channel 103A, which may be a system bus or other suitable connection. Computing device 100 may also be operatively coupled to communication unit 110, further described below, by a communication channel 103B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing devices 10 in FIGS. 1-2, computing device 100 may be a portable or mobile device such as mobile phones (including smart phones), laptop computers, etc. In some examples, computing device 100 may be a desktop computers, tablet computers, smart television platforms, cameras, personal digital assistants (PDAs), servers, mainframes, etc.

Presence-sensitive display 101, like user interface device 12 as shown in FIG. 1, may include display device 103 and presence-sensitive input device 105. Display device 103 may, for example, receive data from computing device 100 and display the graphical content. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 100 using communication channel 103A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, and any other suitable devices for displaying graphical content. Projector 120 and project screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 100.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 100 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

FIG. 3 also illustrates tablet device 126 and visual display device 130. Tablet device 126 and visual display device 130 may each include computing and connectivity capabilities. Examples of tablet device 126 may include e-reader devices, convertible notebook devices, hybrid slate devices, etc. Examples of visual display device 130 may include televisions, computer monitors, etc. As shown in FIG. 3, tablet device 126 may include a presence-sensitive display 128. Visual display device 130 may include a presence-sensitive display 132. Presence-sensitive displays 128, 132 may include a subset of functionality or all of the functionality of UI device 4 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, tablet device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, tablet device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 103A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may output a graphical keyboard for display at presence-sensitive display 132. For instance, computing device 100 may send data that includes a representation of the graphical keyboard to communication unit 110. Communication unit 110 may send the data that includes the representation of the graphical keyboard to visual display device 130 using external network 114. Visual display device 130, in response to receiving the data using external network 114, may cause presence-sensitive display 132 to output the graphical keyboard. In response to a user performing a gesture at presence-sensitive display 132 to select a group of keys of the keyboard, visual display device 130 may send an indication of the gesture to computing device 100 using external network 114. Communication unit 110 of may receive the indication of the gesture, and send the indication to computing device 100.

Computing device 100 may determine, based on at least one characteristic of the gesture, one or more keys from the plurality of keys. For example, in some instances, computing device 100 utilizes a spatial model probability to determine a sequence of one or more keys from the plurality of keys. Computing device 100 may determine a spatial model probability for each key of the plurality of keys and determine the keys with the highest spatial model probability represent the sequence of keys. Computing device 100 may adjust the spatial probability of each key in the sequence based on a characteristic of a portion of the gesture (e.g., speed, direction, location, etc.). For instance, if the speed of a portion of the gesture associated with one of the keys in the sequence exceeds a speed threshold, computing device 100 may reduce the spatial probability associated with the selected key. Computing device 100 may refine the sequence of keys by adding or removing one or more keys from the sequence based on the characteristic based adjustments to the spatial model probability of each key.

In any case, computing device 100 may determine a character string based on the one or more keys from the plurality of keys. In response to determining that a spatial model probability associated with the one or more keys from the plurality of keys exceeds a probability threshold and the character string is not included in a lexicon, computing device 100 may send data that includes the character string to communication unit 110, which in turn sends the data to visual display device 130 using external network 114. Upon receiving the data, visual display device 130 may cause presence-sensitive display 132 to display the candidate word. In this way, processor 102 may output the candidate word for display at presence-sensitive display 132, in accordance with techniques of the disclosure.

Figure 4A:
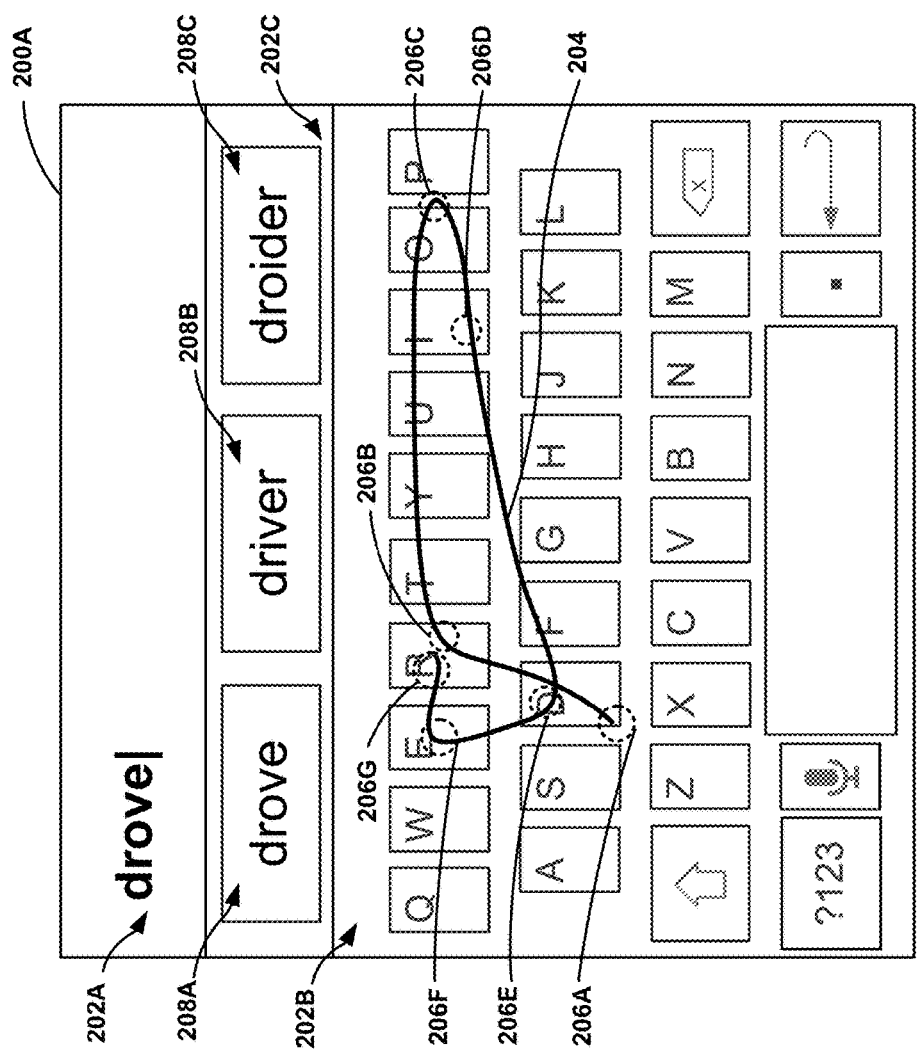
FIGS. 4A-4C are conceptual diagrams illustrating example graphical user interfaces for presenting out-of-vocabulary words, in accordance with one or more aspects of the present disclosure.
Figure 4B:
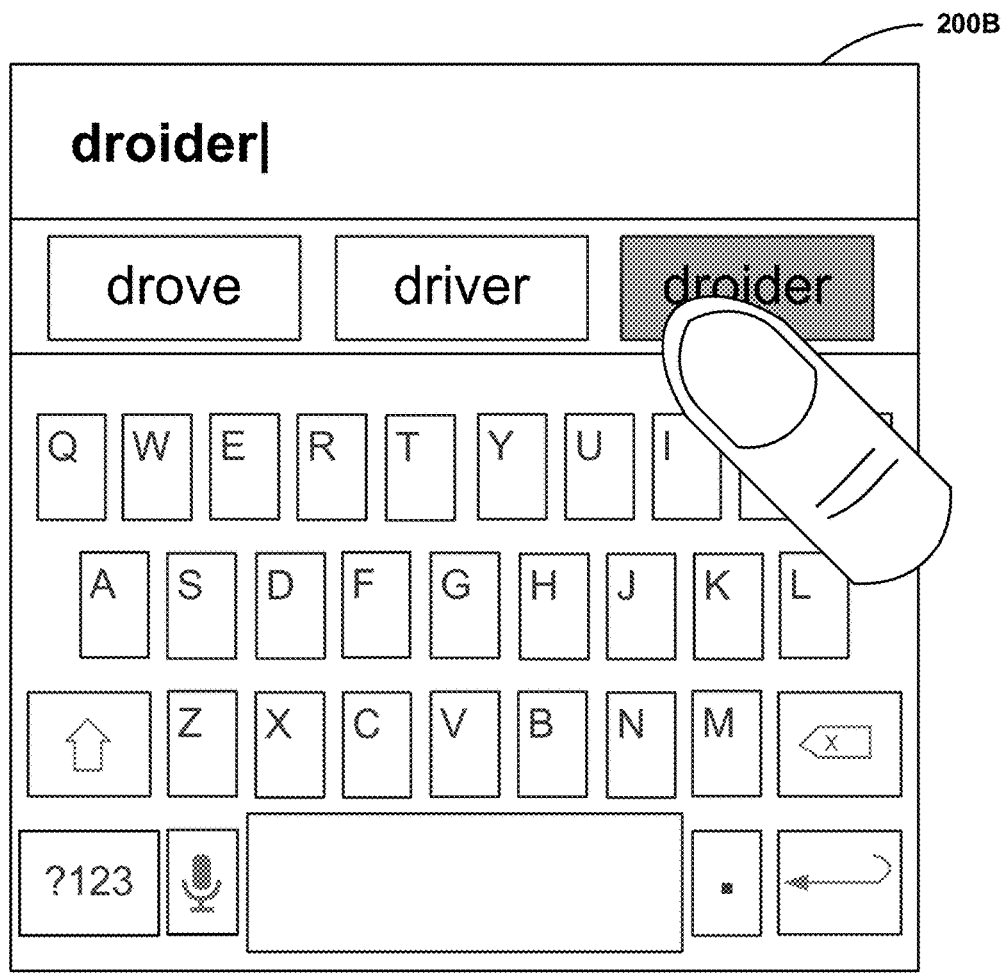
Figure 4C:
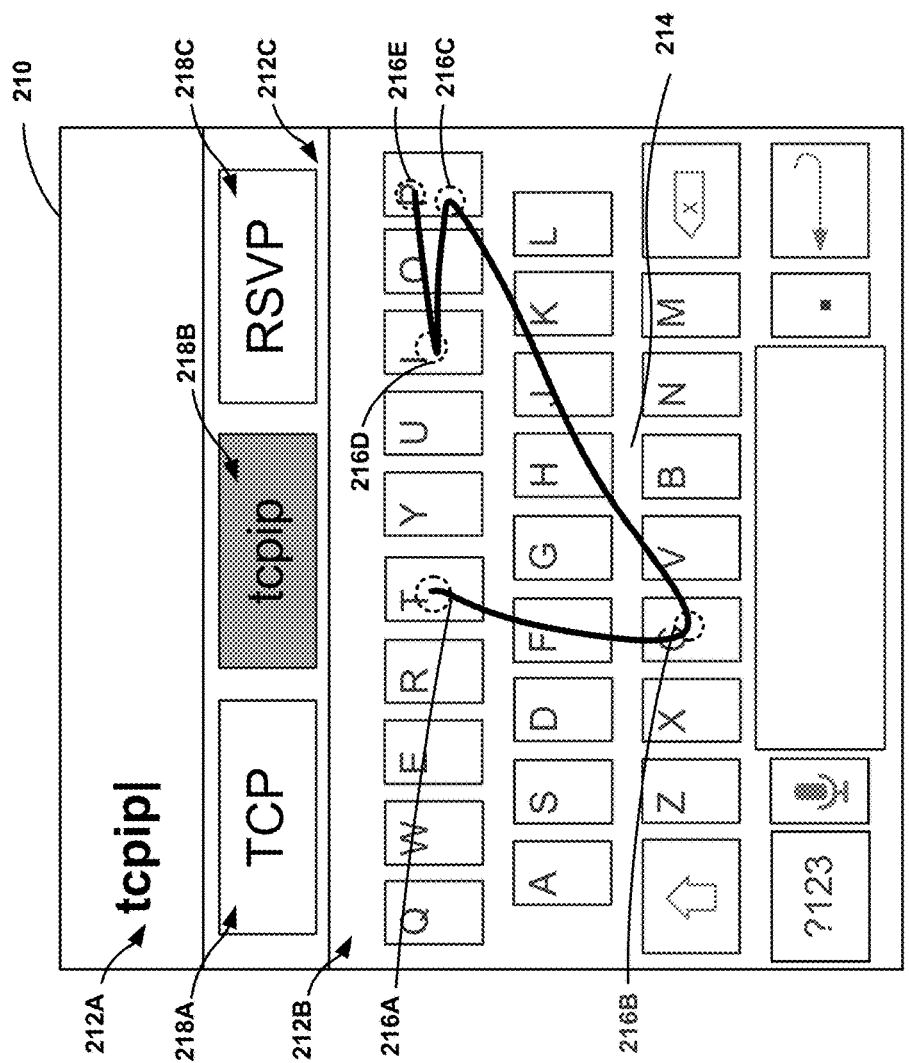

FIGS. 4A-4C are conceptual diagrams illustrating example graphical user interfaces for presenting out-ofvocabulary words, in accordance with one or more aspects of the present disclosure. FIGS. 4A-4C are described below in the context of computing device 10 (described above) from FIG. 1 and FIG. 2.

FIGS. 4A-4B illustrate, respectively, graphical user interfaces 200A and 200B for inputting an OOV word droider. For example, FIG. 4A illustrates graphical user interface 200A that computing device 10 may output for display at UID 12. Graphical user interface 200A includes edit region 202A and graphical keyboard 202B. Graphical user interface 200A may further include suggestion bar region 202C including suggested words 208A-208C (collectively referred to as "suggested words 208") that can be included in edit region 202A. Computing device 10 may receive an indication of gesture 204 detected at UID 12. FIG. 4A illustrates a path of gesture 204 including portions 206A-206G of the path of gesture 204 (collectively "portions" 206) that each represent a portion or subsection of the path of gesture 204.

In response to gesture 204, computing device 10 may determine a sequence of touch events that represent information about gesture 204 including one or more characteristics of gesture 204. For instance, computing device 10 may determine a density, a speed, a direction, and a curvature of portions 206.

Computing device 10 may determine, based at least in part on the indication of gesture 204 and at least one characteristic of gesture 204, one or more keys from the plurality of keys. For example, using a spatial model and comparing locations of the sequence of touch events to locations of keys of graphical keyboard 202B, computing device 10 may determine a spatial model probability that indicates a likelihood of each key of graphical keyboard 202B being selected by gesture 204. The sequence of keys may include each key with a non-zero spatial model probability. For example, the sequence of keys may include (in order) the <D-key>, the <R-key>, the <T-key>, the <Y-key>, the <U-key>, the <I-key>, the <O-key>, again the <I-key>, again the <U-key>, the <F-key>, again the <D-key, the <E-key>, and again the <R-key>.

Computing device 10 may refine the spatial model probability of each key in the sequence of keys based on at least one characteristic of gesture 204. For example, computing device 10 may increase the spatial model probability associated with one or more of the keys in the sequence if the speed of a portion of gesture 204 associated with the one or more keys is less than a speed threshold and decrease the spatial model probability associated with the one or more keys if the speed of a portion of gesture 204 associated with the one or more keys is greater than the speed threshold. Likewise, computing device 10 may adjust the spatial model probability associated with each key by comparing the density, the curvature, and the direction of one or more portions of gesture 204 associated with each key to a respective characteristic threshold.

Computing device 10 may remove one or more keys from the sequence of keys based on the refined spatial model probability of each key. For example, computing device 10 may retain each key in the sequence of keys having a spatial model probability that exceeds a probability threshold (e.g., fifty percent). In this way, based on the characteristics of portions 206 of gesture 204, computing device 10 retains only the keys in the sequence of keys with a greater likelihood of being selected by gesture 204.

Computing device 10 may determine, based on the one or more keys from the plurality of keys, a character string. For example, after adjusting the spatial model probability associated with one or more keys in the sequence, and retaining only the keys with a spatial model probability that satisfies the probability threshold, the refined sequence of keys may include (in order) the <D-key>, the <R-key>, the <O-key>, the <I-key>, again the <D-key, the <E-key>, and again the <R-key>. Computing device 10 may generate a character string that represents sequence of characters represented by the selection of keys in the sequence of keys. The character string may correspond to the character string droider.

In response to determining that a spatial model probability associated with the one or more keys from the plurality of keys exceeds a probability threshold and the character string is not included in a lexicon, computing device 10 may output for display, the character string. In other words, since the spatial model probabilities associated with the one or more keys used to generate the character string droider exceed the probability threshold, computing device 10 may determine gesture 204 may represent a selection of the keys of graphical keyboard 202B for inputting an OOV word. Computing device 10 may output the character string droider as suggested word 208C even though, in this example, droider is not a word or phrase included in the lexicon. For the other suggested words, computing device 10 may utilize a language model and words in a lexicon to spellcheck or otherwise autocorrect the character string droider (e.g., to change the character string droider to a word and/or phrase includes in a lexicon). Computing device 10 may generate one or more candidate words that represent the words and/or phrases in the lexicon that have the highest language model probability of representing a character string based on gesture 204. The top two words in the lexicon (e.g., those words having the greatest language model probability) may correspond to the words drove and driver. Computing device 10 may output these top candidate words as suggested words 208A and 208B within the suggestion bar region 202C. FIG. 4A further illustrates the suggested word with the highest language model probability also being outputted for display in edit region 202A. FIG. 4B illustrates that computing device 10 may allow the user that inputs gesture 204 to provide the final determination on which word to include in edit region 202A. FIG. 4B illustrates a selection of the character string droider being made from user interface 200B.

FIG. 4C illustrates graphical user interfaces 210 for inputting an OOV word tcpip. For example, FIG. 4C illustrates graphical user interface 210 that computing device 10 may output for display at UID 12. Graphical user interface 210 includes edit region 212A and graphical keyboard 212B. Graphical user interface 210 may further include suggestion bar region 212C including suggested words 218A-218C (collectively referred to as "suggested words 218") that can be included in edit region 212A. Computing device 10 may receive an indication of gesture 214 detected at UID 12. FIG. 4C illustrates a path of gesture 214 including portions 216A-216E of the path of gesture 214 (collectively "portions" 216) that each represent a portion or subsection of the path of gesture 214.

In response to gesture 214, computing device 10 may determine a sequence of touch events that represent information about gesture 214 including one or more characteristics of gesture 214. For instance, computing device 10 may determine a density, a speed, a direction, and a curvature of portions 216.

Computing device 10 may determine, based at least in part on the indication of gesture 214 and at least one characteristic of gesture 214, one or more keys from the plurality of keys. For example, using a spatial model and comparing locations of the sequence of touch events to locations of keys of graphical keyboard 212B, computing device 10 may determine a spatial model probability that indicates a likelihood of each key of graphical keyboard 212B being selected by gesture 214. The sequence of keys may include each key with a non-zero spatial model probability. For example, the sequence of keys may include (in order) the <T-key>, the <F-key>, the <C-key>, the <V-key>, the <H-key>, the <I-key>, the <J-key>, the <K-key>, the <P-key>, the <O-key>, the <I-key, again the <O-key>, and again the <P-key>.

Computing device 10 may refine the spatial model probability of each key in the sequence of keys based on at least one characteristic of gesture 214. For example, computing device 10 may increase the spatial model probability associated with one or more of the keys in the sequence if the density, speed, direction, and/or curvature of one or more portions 216 of gesture 214 associated with the one or more keys satisfies a respective characteristic threshold and otherwise decrease the spatial model probability associated with the one or more keys if the density, speed, direction, and/or curvature of the one or more portions 216 of gesture 214 associated with the one or more keys does not satisfy the respective characteristic threshold.

Computing device 10 may remove one or more keys from the sequence of keys based on the refined spatial model probability of each key. For example, computing device 10 may retain each key in the sequence of keys having a spatial model probability that satisfies a probability threshold. In this way, based on the characteristics of portions 216 of gesture 204, computing device 10 retains only the keys in the sequence of keys with a greater likelihood of being selected by gesture 214.

Computing device 10 may determine, based on the one or more keys from the plurality of keys, a character string. For example, after adjusting the spatial model probability associated with one or more keys in the sequence, and retaining only the keys with a spatial model probability that satisfies the probability threshold, the refined sequence of keys may include (in order) the <T-key>, the <C-key>, the <P-key>, the <I-key>, and again the <P-key>. Computing device 10 may generate a character string that represents sequence of characters represented by the selection of keys in the sequence of keys. The character string may correspond to the character string tcpip.

In response to determining that a spatial model probability associated with the one or more keys from the plurality of keys exceeds a probability threshold and the character string is not included in a lexicon, computing device 10 may output for display, the character string. In other words, since the spatial model probabilities associated with the one or more keys used to generate the character string tcpip exceeds the probability threshold, computing device 10 may determine gesture 204 may represent a selection of the keys of graphical keyboard 202B for inputting an OOV word. Computing device 10 may output the character string tcpip as suggested word 218B even though tcpip is not a word or phrase included in the lexicon. For the other suggested words 218, computing device 10 may utilize a language model and words in a lexicon to spellcheck or otherwise autocorrect the character string tcpip (e.g., to change the character string tcpip to a word and/or phrase includes in a lexicon). Computing device 10 may generate one or more candidate words that represent the words and/or phrases in the lexicon that have the highest language model probability of representing a character string based on gesture 214. The top two words in the lexicon (e.g., those words having the greatest language model probability) may correspond to the words TCP and RSVP Computing device 10 may output these top candidate words as suggested words 218A and 218C within the suggestion bar region 212C. FIG. 4C illustrates that computing device 10 may allow the user that inputs gesture 214 to provide the final determination on which word to include in edit region 212A. FIG. 4C illustrates a selection of the character string tcpip being made from user interface 210 (e.g., the rectangular region surrounding suggested word 218B indicates a selection of suggested word 218B which causes computing device 10 to input the character string tcpip in edit region 212A).

Figure 5:
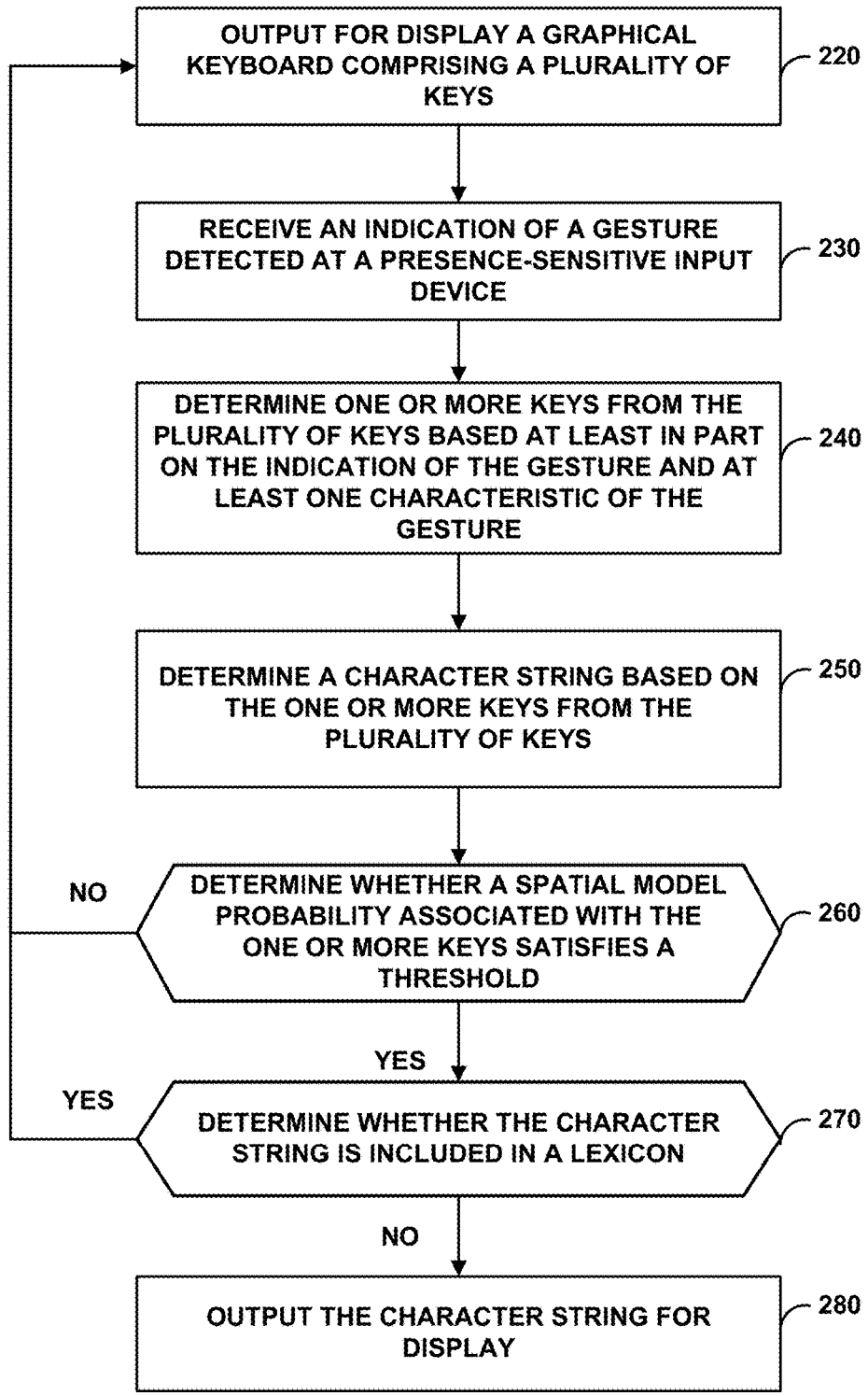
FIG. 5 is a flowchart illustrating an example operation of the computing device, in accordance with one or more aspects of the present disclosure.

FIG. 5 is a flowchart illustrating an example operation of the computing device, in accordance with one or more aspects of the present disclosure. The process of FIG. 5 may be performed by one or more processors of a computing device, such as computing device 10 illustrated in FIG. 1 and FIG. 2. For purposes of illustration only, FIG. 5 is described below within the context of computing devices 10 of FIG. 1 and FIG. 2.

In the example of FIG. 5, a computing device may output, for display a graphical keyboard comprising a plurality of keys (220). For example, computing device 10 may output user interface 14 including graphical keyboard 16B for display at UID 12.

In the example of FIG. 5, the computing device may receive an indication of a gesture detected at a presence-sensitive input device (230). For example, UID 12 may detect gesture 30 at one or more locations of UID 12 where UID 12 presents the keys of graphical keyboard 16B.

In the example of FIG. 5, the computing device may determine, based at least in part on the indication of the gesture and at least one characteristic of the gesture, one or more keys from the plurality of keys (240). For example, gesture module 24 may generate one or more touch events based on information received from UID 12 about gesture 30. Gesture module 24 may determine one or more characteristics about portions 34 of gesture 30 (e.g., a speed, a density, a direction, etc.).

In the example of FIG. 5, the computing device may determine, based on the one or more keys from the plurality of keys, a character string (250). For example, gesture module 24 may share the one or more touch events based on gesture 30 with keyboard module 22. From the touch events, keyboard module 22 may determine a selection of one or more keys from gesture 30. Keyboard module 22 may utilize a spatial model (e.g., spatial model module 26) to determine a sequence of keys based on gesture 30. The sequence of keys may include the <S-key>, <A-key>, <S-key>, <R-key>, <T-key>, <Y-key>, <U-key>, <I-key>, <O-key>, and <K-key>.

In the example of FIG. 5, the computing device may determine whether a spatial model probability associated with the one or more keys satisfies a threshold (260). For example, keyboard module 22 may refine the sequence of keys based one or more characteristics of portions 34 of gesture 30 associated with each key in the sequence. Keyboard module 22 may increase or decrease the spatial model probability associated with one or more of the keys in the sequence depending on whether the one or more characteristics of portions 34 of gesture 30 associated with each key in the sequence satisfy a characteristic threshold. Keyboard module 22 may compare the spatial model probability of each key in the sequence of keys to a probability threshold. If the spatial model probability of one or more keys does not exceed or otherwise satisfy the probability threshold, keyboard module 22 may remove the one or more keys from the sequence. Keyboard module 22 may determine the remaining keys in the sequence represent a refined sequence of keys. The refined sequence of keys may include the <S-key>, <A-key>, <T-key>, <O-key>, and <K-key>. Based on the refined sequence of keys, keyboard module 22 may determine a character string that represents a selection of the one or more keys in the refined sequence of keys. For example, keyboard module 22 may determine the character string satok based on the refined sequence of keys.

In the example of FIG. 5, the computing device may determine whether the character string is included in a lexicon (270). For example, keyboard module 22 may utilize a language model (e.g., language model module 28) to spellcheck, grammar check, or otherwise autocorrect the character string satok. Keyboard module 22 may determine one or more candidate words and/or phrases based on the character string. Keyboard module 22 may determine the character string satok is not included in the one or more candidate words and further determine the character string satok is not included in the lexicon.

In the example of FIG. 5, in response to determining that the character string is not included in a lexicon and a spatial model probability associated with the one or more keys from the plurality of keys exceeds a probability threshold, the computing device may output, for display, the character string (280). For example, keyboard module 22 may share the one or more candidate words included in the lexicon with UI module 20 for inclusion in suggested word region 16C of user interface 14. In addition, keyboard module 22 may determine the spatial model probability associated with each key in the refined sequence of keys satisfies a probability threshold and therefore keyboard module 22 may share the character string satok with UI module 20 for inclusion in user interface 14 as suggested word 38C in suggested word region 16C. UI module 20 may cause UID 12 to output suggested word 38C (e.g., the character string satok) for display.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:
1. A method comprising:
outputting, by a computing device and for display, a graphical keyboard comprising a plurality of keys;
receiving, by the computing device, an indication of a gesture detected at a region of a presence-sensitive input device that is associated with a location at which the plurality of keys are displayed;
determining, by the computing device, based at least in part on the indication of the gesture, a character string that is not included in a lexicon;
determining, by the computing device, based on the character string, a candidate word or phrase from the lexicon;
determining, by the computing device, whether a category of text input associated with the character string is a particular category of text input;
if the category of text input associated with the character string is the particular category of text input, outputting, by the computing device, for display, the character string; and
if the category of text input associated with the character string is not the particular category of text input, outputting, by the computing device, for display, the candidate word or phrase from the lexicon.

2. The method of claim 1, wherein the particular category of text input is one of a group comprising a portion of a name, a portion of an address, and a portion of an electronic mail address.

3. The method of claim 1, wherein the graphical keyboard is output for display as part of a graphical user interface, the method further comprising:
   determining, by the computing device, that the character string is associated with a particular portion of the graphical user interface; and
   determining, by the computing device, based on the particular portion of the graphical user interface, the category of text input associated with the character string.

4. The method of claim 1, further comprising:
   determining, by the computing device, based at least in part on the indication of the gesture, a spatial model probability associated with one or more keys from the plurality of keys; and
   adjusting, by the computing device, based on at least one characteristic of the gesture, the spatial model probability associated with the one or more keys from the plurality of keys, wherein:
      the character string is further determined based on the adjusted spatial model probability associated with the one or more keys from the plurality of keys; and
      the character string is output if the category of text input associated with the character string is not the particular category of text input and if the adjusted spatial model probability associated with the one or more keys from the plurality of keys exceeds a probability threshold.

5. The method of claim 4, wherein the candidate word or phrase from the lexicon is output if the category of text input associated with the character string is the particular category of text input and if the adjusted spatial model probability associated with the one or more keys from the plurality of keys does not exceed the probability threshold.

6. The method of claim 4, wherein the at least one characteristic of the gesture includes at least one of a speed of a portion of the gesture, a density of the portion of the gesture, or a curvature of the portion of the gesture.

7. The method of claim 4, wherein adjusting the spatial model probability associated with the one or more keys from the plurality of keys comprises:
   if the at least one characteristic satisfies a threshold, increasing, by the computing device, the spatial model probability associated with the one or more keys; and
   if the at least one characteristic does not satisfy the threshold, decreasing, by the computing device, the spatial model probability.

8. The method of claim 1, wherein the character string is output for display at a suggestion region of the graphical keyboard if the category of text input associated with the character string is the particular category of text input.

9. The method of claim 8, further comprising:
   while outputting the character string for display at the suggestion region of the graphical keyboard, outputting, by the computing device, for display at the suggestion region of the graphical keyboard, one or more additional candidate words or phrases from the lexicon.

10. A computing device comprising:
    at least one processor; and
    a memory configured to store instructions that, when executed, cause the at least one processor to:
       output, for display at a display device operably coupled to the computing device, a graphical keyboard comprising a plurality of keys;
       receive, an indication of a gesture detected at a region of a presence-sensitive input device that is associated with a location of the display device at which the plurality of keys are displayed;
       determine, based at least in part on the indication of the gesture, a character string that is not included in a lexicon;
       determine, based on the character string, a candidate word or phrase from the lexicon;
       determine whether a category of text input associated with the character string is a particular category of text input;
       if the category of text input associated with the character string is the particular category of text input, output, for display at the display device, the character string; and
       if the category of text input associated with the character string is not the particular category of text input, output, for display at the display device, the candidate word or phrase from the lexicon.

11. The computing device of claim 10, wherein the computing device comprises at least one of the display device or the presence-sensitive input device.

12. The computing device of claim 10, wherein the display device comprises the presence-sensitive input device.

13. The computing device of claim 10, wherein the display device comprises the presence-sensitive input device.

14. The computing device of claim 10, wherein the instructions, when executed, further cause the at least one processor to:
    output the graphical keyboard for display as part of a graphical user interface;
    determine that the character string is associated with a particular portion of the graphical user interface; and
    determine, based on the particular portion of the graphical user interface, the category of text input associated with the character string.

15. The computing device of claim 10, wherein the instructions, when executed, further cause the at least one processor to:
    determine, based at least in part on the indication of the gesture, a spatial model probability associated with one or more keys from the plurality of keys;
    adjust, based on at least one characteristic of the gesture, the spatial model probability associated with the one or more keys from the plurality of keys;
    determine the character string further based on the adjusted spatial model probability associated with the one or more keys from the plurality of keys; and
    output the character string if the category of text input associated with the character string is not the particular category of text input and if the adjusted spatial model probability associated with the one or more keys from the plurality of keys exceeds a probability threshold.

16. A non-transitory computer-readable storage medium encoded with instructions that, when executed, cause at least one processor of a computing device to:
    output, for display at a display device operably coupled to the computing device, a graphical keyboard comprising a plurality of keys;

receive, an indication of a gesture detected at a region of a presence-sensitive input device that is associated with a location of the display device at which the plurality of keys are displayed;

determine, based at least in part on the indication of the gesture, a character string that is not included in a lexicon;

determine, based on the character string, a candidate word or phrase from the lexicon;

determine whether a category of text input associated with the character string is a particular category of text input;

if the category of text input associated with the character string is the particular category of text input, output, for display at the display device, the character string; and if the category of text input associated with the character string is not the particular category of text input, output, for display at the display device, the candidate word or phrase from the lexicon.

17. The non-transitory computer-readable storage medium of claim 16, wherein the instructions, when executed, cause the at least one processor to output the character string for display at a suggestion region of the graphical keyboard if the category of text input associated with the character string is the particular category of text input.

18. The non-transitory computer-readable storage medium of claim 17, wherein the instructions, when executed, further cause the at least one processor to:

while outputting the character string for display at the suggestion region of the graphical keyboard, output, for display at the suggestion region of the graphical keyboard, one or more additional candidate words or phrases from the lexicon.

19. The non-transitory computer-readable storage medium of claim 16, wherein the instructions, when executed, further cause the at least one processor to:

output the graphical keyboard for display as part of a graphical user interface;

determine that the character string is associated with a particular portion of the graphical user interface; and determine, based on the particular portion of the graphical user interface, the category of text input associated with the character string.

20. The non-transitory computer-readable storage medium of claim 16, wherein the instructions, when executed, further cause the at least one processor to:

determine, based at least in part on the indication of the gesture, a spatial model probability associated with one or more keys from the plurality of keys;

adjust, based on at least one characteristic of the gesture, the spatial model probability associated with the one or more keys from the plurality of keys;

determine the character string further based on the adjusted spatial model probability associated with the one or more keys from the plurality of keys; and output the character string if the category of text input associated with the character string is not the particular category of text input and if the adjusted spatial model probability associated with the one or more keys from the plurality of keys exceeds a probability threshold.

* * * * *